(12) United States Patent
Kobayashi et al.

(10) Patent No.: US 10,020,507 B2
(45) Date of Patent: Jul. 10, 2018

(54) POSITIVE ELECTRODE ACTIVE MATERIAL FOR LITHIUM SECONDARY BATTERY AND POSITIVE ELECTRODE INCLUDING SAME

(71) Applicant: NGK INSULATORS, LTD., Nagoya-Shi (JP)

(72) Inventors: Nobuyuki Kobayashi, Nagoya (JP); Yukinobu Yura, Nagoya (JP); Shohei Yokoyama, Nagoya (JP); Kei Sato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 526 days.

(21) Appl. No.: 14/546,285

(22) Filed: Nov. 18, 2014

(65) Prior Publication Data

US 2015/0093580 A1    Apr. 2, 2015

Related U.S. Application Data

(63) Continuation of application No. PCT/JP2013/075504, filed on Sep. 20, 2013.

(Continued)

(30) Foreign Application Priority Data

Oct. 15, 2012 (JP) .................................. 2012-228450
Nov. 30, 2012 (JP) .................................. 2012-263072

(Continued)

(51) Int. Cl.
*H01M 4/52* (2010.01)
*H01M 4/36* (2006.01)
(Continued)

(52) U.S. Cl.
CPC ............ *H01M 4/523* (2013.01); *C01G 53/42* (2013.01); *C01G 53/50* (2013.01); *H01M 4/131* (2013.01);
(Continued)

(58) Field of Classification Search
None
See application file for complete search history.

(56) References Cited

U.S. PATENT DOCUMENTS 5,631,100 A    5/1997  Yoshino et al.
2005/0123832 A1   6/2005  Tsukuma et al.
(Continued)

FOREIGN PATENT DOCUMENTS

JP    05-226004 A    9/1993
JP    2001-85006 A   3/2001
(Continued)

OTHER PUBLICATIONS

International Search Report and Written Opinion (With English Translation), International Application No. PCT/JP2013/075504, dated Nov. 12, 2013 (15 pages).

(Continued)

*Primary Examiner* — Ronak C Patel
(74) *Attorney, Agent, or Firm* — Burr & Brown, PLLC

(57) ABSTRACT

There is provided a positive electrode active material capable of achieving a high volume energy density and yet superior rate characteristics when configured as a positive electrode for lithium secondary batteries. This positive electrode active material comprises a plurality of secondary particles each comprising primary particles composed of a lithium-nickel based complex oxide having a layered rock-salt structure. The plurality of secondary particles have a volume-based average particle diameter D50 of 5 to 100 μm, and at least part of the plurality of secondary particles are coarse secondary particles having a particle diameter of 9 μm or greater. The coarse secondary particles have a voidage of 5 to 25%, and the ratio of through holes among all voids in the coarse secondary particles is 70% or greater.

18 Claims, 7 Drawing Sheets

Related U.S. Application Data

(60) Provisional application No. 61/731,543, filed on Nov. 30, 2012, provisional application No. 61/746,255, filed on Dec. 27, 2012.

(30) Foreign Application Priority Data

Apr. 25, 2013 (JP) ................................ 2013-092730
Jul. 18, 2013 (JP) ................................ 2013-149070

(51) Int. Cl.
  *H01M 4/131* (2010.01)
  *H01M 4/505* (2010.01)
  *H01M 4/525* (2010.01)
  *C01G 53/00* (2006.01)
  *H01M 10/0525* (2010.01)
  *H01M 10/052* (2010.01)
  *H01M 4/02* (2006.01)

(52) U.S. Cl.
  CPC .......... *H01M 4/366* (2013.01); *H01M 4/505* (2013.01); *H01M 4/525* (2013.01); *C01P 2002/60* (2013.01); *C01P 2002/74* (2013.01); *C01P 2004/03* (2013.01); *C01P 2004/20* (2013.01); *C01P 2004/54* (2013.01); *C01P 2004/61* (2013.01); *C01P 2006/11* (2013.01); *C01P 2006/14* (2013.01); *H01M 10/052* (2013.01); *H01M 10/0525* (2013.01); *H01M 2004/021* (2013.01); *Y10T 428/2991* (2015.01)

(56) References Cited

U.S. PATENT DOCUMENTS

| | | | | |
|---|---|---|---|---|
| 2007/0248883 | A1* | 10/2007 | Oda | H01M 4/485 429/231.1 |
| 2009/0104517 | A1 | 4/2009 | Yuasa et al. | |
| 2010/0159330 | A1* | 6/2010 | Sugiura | H01M 4/131 429/231.4 |
| 2010/0159332 | A1 | 6/2010 | Sugiura et al. | |
| 2011/0240913 | A1* | 10/2011 | Kim | C01G 45/1228 252/182.1 |
| 2011/0318641 | A1* | 12/2011 | Sugiura | C01G 51/42 429/231.8 |
| 2012/0085967 | A1 | 4/2012 | Yokoyama et al. | |
| 2012/0256337 | A1* | 10/2012 | Yokoyama | H01M 4/525 264/15 |
| 2012/0258358 | A1 | 10/2012 | Yura et al. | |
| 2012/0258365 | A1* | 10/2012 | Yokoyama | H01M 4/525 429/223 |
| 2013/0224586 | A1* | 8/2013 | Nagai | H01M 4/131 429/211 |
| 2014/0050976 | A1 | 2/2014 | Nagai | |

FOREIGN PATENT DOCUMENTS

| | | | |
|---|---|---|---|
| JP | 2001-243951 | A | 9/2001 |
| JP | 2002-75365 | A | 3/2002 |
| JP | 2003-132887 | A | 5/2003 |
| JP | 2004-83388 | A | 3/2004 |
| JP | 2004-253174 | A | 9/2004 |
| JP | 2009-99418 | A | 5/2009 |
| JP | 2009-117241 | A | 5/2009 |
| JP | 2010-219069 | A | 9/2010 |
| JP | 2012-28215 | A | 2/2012 |
| JP | 2012-84502 | A | 4/2012 |
| WO | 2010/074304 | A1 | 7/2010 |
| WO | 2011/162253 | A1 | 12/2011 |
| WO | WO 2012/049778 | * | 4/2012 |
| WO | 2012/137391 | A1 | 10/2012 |
| WO | 2012/137535 | A1 | 10/2012 |
| WO | 2012/153379 | A1 | 11/2012 |

OTHER PUBLICATIONS

English translation of Written Opinion (PCT/ISA/237) (Application No. PCT/JP2013/075504) dated Nov. 12, 2013.

* cited by examiner

POSITIVE ELECTRODE ACTIVE MATERIAL FOR LITHIUM SECONDARY BATTERY AND POSITIVE ELECTRODE INCLUDING SAME

BACKGROUND OF THE INVENTION

1. Field of the Invention

The present invention relates to a positive electrode active material having a layered rock-salt structure for lithium secondary batteries, and a positive electrode including the positive electrode active material.

2. Description of the Related Art

Positive electrode active materials including a lithium complex oxide (lithium transition metal oxide) having a layered rock-salt structure are widely known as positive electrode active materials in lithium secondary batteries (which may be referred to as lithium ion secondary batteries) (see, for example, Patent Document 1 (JP5-226004A) and Patent Document 2 (JP2003-132887A)).

It is known that, in a positive electrode active material of this type, diffusion of lithium ions ($Li^+$) therein is performed along an in-plane direction of the (003) plane (i.e., any direction in the plane parallel to the (003) plane), while intercalation and deintercalation of lithium ions occur through a crystal plane other than the (003) plane (e.g., the (101) plane or the (104) plane).

Thus, in positive electrode active materials of this type, attempts have been made to enhance battery characteristics of lithium secondary batteries by exposing a crystal plane through which lithium ions are favorably intercalated and deintercalated (i.e., a plane other than the (003) plane, such as the (101) plane or the (104) plane) to a surface which comes into contact with a larger amount of electrolyte (see, for example, Patent Document 3 (WO2010/074304)).

In addition, in positive electrode active materials of this type, those having pores (also referred to as holes or voids) formed therein are known (see, for example, Patent Document 4 (JP2002-75365A), Patent Document 5 (JP2004-083388A), and Patent Document 6 (JP2009-117241A)).

In particular, Patent Document 7 (WO2012/137391) discloses a lithium secondary battery positive electrode active material with a layered rock-salt structure, comprising secondary particles composed of numerous primary particles having an average particle diameter of 0.01 μm or greater and 5 μm or less, wherein the secondary particles have a degree of (003) plane orientation of 60% or greater, an average particle diameter of 1 μm or greater and 100 μm or less, an aspect ratio, which is a value obtained by dividing the longer axis diameter by the shorter axis diameter, of 1.0 or greater and less than 2, a voidage of 3% or greater and 30% or less, an average pore diameter of 0.1 μm or greater and 5 μm or less, and a value obtained by dividing the average particle diameter of the primary particles by the average pore diameter of 0.1 or greater and 5 or less.

In addition, a positive electrode active material having through holes and hollow parts is also known. For example, Patent Document 8 (WO2012/153379) discloses positive electrode active material particles having a shell part composed of a lithium transition metal oxide, a hollow part formed in the interior of the shell, and through holes penetrating the shell, wherein the hollow part accounts for 23% or greater of the apparent cross-sectional area, and the shell part has a thickness of 2.2 μm or less. Patent Document 9 (JP2004-253174) discloses a positive electrode active material for non-aqueous electrolyte secondary batteries, wherein the lithium transition metal complex oxide is a lithium transition metal complex oxide composed of hollow particles having an outer shell part on the outside and a space part inside the outer shell part, and when the cross-section is revealed, the proportion of the area of the space part to the total of the outer shell part and the space part is preferably greater than 0% and less than 20% and is optimally 7 to 16%.

CITATION LIST

Patent Documents

Patent Document 1: JP5-226004A
Patent Document 2: JP2003-132887A
Patent Document 3: WO2010/074304
Patent Document 4: JP2002-75365A
Patent Document 5: JP2004-083388A
Patent Document 6: JP2009-117241A
Patent Document 7: WO2012/137391
Patent Document 8: WO2012/153379
Patent Document 9: JP2004-253174

SUMMARY OF THE INVENTION

It is understood that with positive electrode active materials as disclosed in Patent Documents 7 to 9, some enhancement of output and cycle characteristics can be expected. However, according to the inventors' findings, in the case where an electrode is configured to have a thickness of 50 μm or greater with a positive electrode active material of this type, when discharging is performed at a relatively large current density, diffusion of lithium ions in the thickness direction cannot keep up, and the capacity tends to be lowered. Therefore, further improvements are desired. For example, designing an electrode to have an electrode density of 3.4 g/cc or greater and an electrode thickness of 50 μm or greater using a highly packable powder having an average particle diameter D50 of 5 μm or greater in order to obtain an electrode with a high volume energy density does not result in high rate characteristics (a capacity retention ratio at a high discharge rate) as expected. This is considered to be because it is very difficult for lithium ions migrated from the negative electrode to diffuse in the interior of the positive electrode. That is, it is considered that since large particles are thickly and densely packed, lithium ions have to go through narrow and tortuous paths for diffusion. Therefore, it is desired to achieve a high volume energy density and yet superior rate characteristics when a positive electrode active material is configured as a positive electrode for lithium secondary batteries.

The inventors have currently found that in coarse secondary particles, which have a particle diameter equal to or greater than a predetermined particle diameter, of a positive electrode active material composed of a lithium-nickel based complex oxide having a layered rock-salt structure, increasing the through hole ratio to 70% or greater at a voidage of 5 to 25% makes it possible to achieve a high volume energy density and yet superior rate characteristics when the positive electrode active material is configured as a positive electrode for lithium secondary batteries.

Accordingly, an object of the present invention is to provide a positive electrode active material that is capable of achieving a high volume energy density and yet superior rate characteristics when configured as a positive electrode for lithium secondary batteries.

According to one embodiment of the present invention, there is provided a positive electrode active material for lithium secondary batteries, comprising a plurality of secondary particles each comprising primary particles composed of a lithium-nickel-based complex oxide having a layered rock-salt structure, wherein the plurality of secondary particles have a volume-based average particle diameter D50 of 5 to 100 µm, wherein at least part of the plurality of secondary particles are coarse secondary particles having a particle diameter of 9 µm or greater, wherein the coarse secondary particles have a voidage of 5 to 25%, and wherein a ratio of through holes among all voids in the coarse secondary particles is 70% or greater.

According to another aspect of the present invention, there is provided a positive electrode for lithium secondary batteries, comprising a positive electrode active material layer comprising the positive electrode active material of the present invention, a binder, and an electrically conductive additive.

DETAILED DESCRIPTION OF THE INVENTION

Definitions

Figure 1:
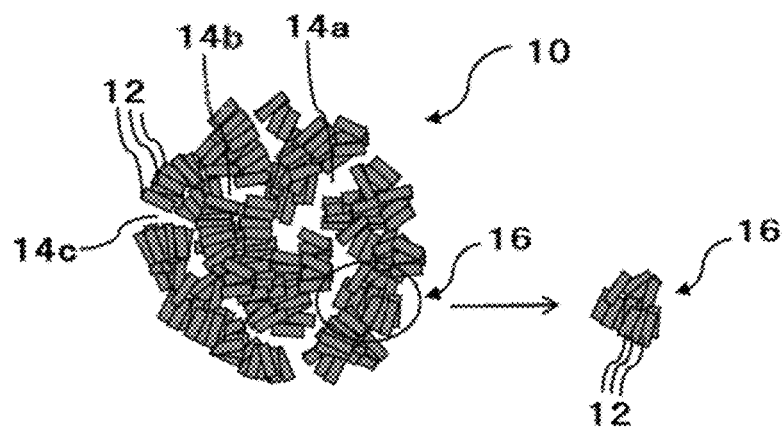
FIG. 1 is a schematic cross-sectional diagram of an example of the positive electrode active material of the present invention.

Definitions of some terms used herein will now be provided below.

"Primary particle" refers to a unit particle that does not include grain boundaries therein. In contrast, an agglomerate of primary particles or an aggregate of a plurality of (numerous) single-crystal primary particles are referred to as "secondary particle". In the present specification, the term "tertiary particle" may be used as a term for conveniently referring to a particle composed of a granulated powder in which numerous secondary particles are agglomerated, and thus falls under the category of "secondary particle" by definition. "Average particle diameter" is an average value of the diameters of particles. The "diameter" is typically a diameter in a spherical shape in the case where the particle is assumed to be in the form of a sphere having the same volume or the same cross-sectional area. An "average value" which is calculated based on the number is suitable. The average particle diameter of the primary particles can be determined, for example, by observing the surface or cross-section of secondary particles with a scanning electron microscope (SEM). The average particle diameter of secondary particles is evaluated as a volume-based average particle diameter D50 (median diameter) measured with a laser diffraction/scattering type particle size distribution analyzer (e.g., model number "MT3000-II" manufactured by Nikkiso Co., Ltd.) using water as a dispersion medium.

"Coarse secondary particle" is a secondary particle having a particle diameter of 9 µm or greater, and can be a secondary particle in various shapes such as an approximately spherical shape and a plate-like shape. In the case where a secondary particle has a shape in which the diameters in the longitudinal and transverse directions are different as in a plate-like secondary particle, a secondary particle having a diameter of 9 µm or greater in the transverse direction is classified as a coarse secondary particle in the present invention.

"Voidage" is a volume ratio of voids (pores including open pores and closed pores) in the positive electrode active material (in particular, coarse secondary particles) of the present invention. "Voidage" may be referred to as "porosity". This "voidage" is determined by, for example, calculation from bulk density and true density. Among the pores, "open pores" are pores that are in communication with outside. Among the pores, "closed pores" are pores that are not in communication with outside. "Through holes" are open pores, both ends of which are in communication with outside. "Non-through holes" are pores, at least one end of which is not in communication with outside, and include not only open pores that are not through holes but also closed pores.

"Open pore ratio" is a ratio of open pores that are in communication with outside air to all pores in secondary particles (in particular, coarse secondary particles). That is, the "open pore ratio" is (area of open pore portion)/(area of open pore portion+area of closed pore portion). A resin can be introduced from outside into an open pore because the open pore is in communication with outside, while a resin cannot be introduced from outside into a closed pore because the closed pore is not in communication with outside. Accordingly, the open pore ratio can be determined by performing resin embedding in which resin is introduced into voids (thus, into open pores) while air present in the open pores is sufficiently expelled by using a vacuum impregnation apparatus; treating the portion of the voids impregnated with the resin as open pores while treating the portion of the voids not impregnated with the resin as closed pores; determining the areas of these portions by, for example, image processing on an SEM image of the cross-section of the aforementioned secondary particles; and calculating (area of open pore portion)/(area of open pore portion+area of closed pore portion).

"Through hole ratio" is a ratio of through holes that are in communication with outside air to all pores in secondary particles (in particular, coarse secondary particles). That is, the through hole ratio is (area of through hole portion)/(area of through hole portion+area of non-through hole portion). Resin can be introduced from outside into a through hole under atmospheric pressure because both ends are in communication with outside, while resin cannot be introduced from outside into a non-through hole under atmospheric pressure because at least one end is not in communication with outside. Accordingly, concerning the through hole ratio, the state of resin impregnation in voids is evaluated in the same manner as the open pore ratio except that the resin embedding for introducing resin into voids is performed without using a vacuum impregnation apparatus in a manner that a powder is placed at the bottom of a vessel, of which the inner wall the resin is allowed to flow down along so as to slowly permeate the powder due to capillary force. The through hole ratio can be determined by treating the portion of the voids impregnated with the resin as through holes while treating the portion of the voids not impregnated with the resin as non-through holes; determining the areas of these portions by, for example, image processing on an SEM image of the cross-section of the aforementioned secondary particles; and calculating (area of through hole portion)/(area of through hole portion+area of non-through hole portion).

"Average open pore diameter" means an average pore diameter of open pores, and is an average value of the diameters of open pores in secondary particles (in particular, coarse secondary particles). This "diameter" is typically a diameter in a spherical shape in the case where the open pore is assumed to be in the form of a sphere having the same volume or the same cross-sectional area. An "average value" which is calculated based on the volume is suitable. The average open pore diameter can be determined by a well-known technique, such as image processing on an SEM image of the cross-section of secondary particles, or a mercury intrusion technique.

"Average through hole diameter" means an average pore diameter of through holes, and is an average value of the diameters of the through holes in secondary particles (in particular, coarse secondary particles). This "diameter" is typically a diameter in a spherical shape in the case where the through hole is assumed to be in the form of a sphere having the same volume or the same cross-sectional area. An "average value" which is calculated based on the volume is suitable. The average through hole diameter can be determined by image processing on an SEM image of the cross-section of secondary particles, or a mercury intrusion technique. When the through hole ratio is 70% or greater, it is possible to replace the through hole ratio with an average open pore diameter value determined by a mercury intrusion technique or the like.

"Tap density" is an increased bulk density obtained after mechanically tapping a vessel containing a powder sample. The tap density is obtained by mechanically tapping a measuring cylinder or vessel containing a powder sample. Measurement of tap density is performed by measuring the initial volume or mass of a powder, mechanically tapping a measuring cylinder or vessel, and reading the volume or mass until a change in volume or mass becomes barely recognizable.

"Press density" is a bulk density obtained when a powder sample is molded into tablets in a metal mold or the like at a constant pressing pressure.

Positive Electrode Active Material for Lithium Secondary Batteries

The positive electrode active material for lithium secondary batteries of the present invention comprises a plurality of secondary particles each comprising numerous primary particles composed of a lithium-nickel based complex oxide having a layered rock-salt structure. The plurality of secondary particles have a volume-based average particle diameter D50 of 5 to 100 µm, and at least part of which is coarse secondary particles having a particle diameter of 9 µm or greater. The coarse secondary particles have a voidage of 5 to 25%, and the ratio of through holes among all voids in the coarse secondary particles is 70% or greater. The proportion of the coarse secondary particles among all the secondary particles is preferably 20 to 100% by mass. A reason for specifying the voidage and the through hole ratio of the coarse secondary particles having a particle diameter of 9 µm or greater in the present invention is that the voidage and the through hole ratio of the coarse secondary particles contribute more greatly to an enhancement of rate characteristics than those of fine secondary particles that are smaller than the coarse secondary particles, and, also, it is easier to control and evaluate their voidage and through hole ratio. In particular, as described above, it is normally considered that in the case of a positive electrode in which a powder having a large particle diameter is thickly and densely packed, lithium ions have to go through narrow and tortuous paths for diffusion, and lithium ions migrated from the negative electrode are unlikely to diffuse in the interior of the positive electrode. With coarse secondary particles having the aforementioned voidage and through hole ratio, such disadvantages are overcome or reduced, making it possible to enhance rate characteristics. In addition, coarse secondary particles, when used as a mixture with fine secondary particles that are smaller than the coarse secondary particles, allow a high press density to be more easily achieved even at a relatively low pressing pressure during positive electrode preparation, and as a result, also have an advantage that an enhancement of volume energy density and, accordingly, a higher output can be expected. Therefore, naturally, the positive electrode active material of the present invention may contain fine secondary particles that have a particle diameter of less than 9 µm and that are smaller than the coarse secondary particles, such fine secondary particles may also have a voidage of 5 to 20%, and the ratio of through holes among all voids in such fine secondary particles may also be 70% or greater.

FIG. 1 shows a schematic cross-sectional diagram of such a coarse secondary particle. As shown in FIG. 1, a coarse secondary particle 10 is composed of secondary particles each composed of numerous primary particles 12 and has voids 14a, 14b, and 14c. The void 14a is a through hole, the both ends of which are in communication with outside air. The void 14b is a closed pore, neither end of which is in communication with outside air, and is classified as a non-through hole. The void 14c is an open pore, one end of which is not in communication with outside air, and this is also classified as a non-through hole. While the coarse secondary particle 10 with these voids has a relatively low voidage of 5 to 20%, the ratio of through holes among all voids (i.e., the through hole ratio) is extremely high at 70% or greater. Due to this combination of a low voidage and a high through hole ratio, the positive electrode active material of the present invention, when configured as a positive electrode for lithium secondary batteries, can achieve a high volume energy density and yet superior rate characteristics.

That is, at a relatively low voidage of 5 to 25%, the active material is densely packed while having an appropriate level of voids, and it is therefore possible to provide a high volume energy density while ensuring basic functions as voids for improving charge/discharge characteristics. Further, it is considered that, due to an extremely high through hole ratio at 70% or greater, the rate characteristics, which are likely to be impaired in association with a low voidage, can be rather significantly enhanced. In this regard, as described above, with conventional positive electrode active materials as disclosed in Patent Documents 7 to 9, when an electrode is designed to have an electrode density of 3.4 g/cc or greater and an electrode thickness of 50 µm or greater with use of a highly packable powder having an average particle diameter D50 of 5 µm or greater in order to obtain an electrode having a high volume energy density, rate characteristics (a capacity retention ratio at a high discharge rate) does not become as high as expected. This is considered to be because it is very difficult for lithium ions migrated from the negative electrode to diffuse in the interior of the positive electrode. That is, it is considered that since large particles are thickly and densely packed, lithium ions have to go through narrow and tortuous paths for diffusion. In this regard, it is considered that a positive electrode active material extremely rich in through hole (in particular, coarse secondary particles), which is defined by an extremely high through hole ratio of 70% or greater, brings about the following effects: (1) allowing an electrically conductive additive such as acetylene black to permeate the positive electrode active material due to capillary force during electrode preparation; (2) allowing an electrolytic solution to permeate the positive electrode active material due to capillary force during battery assembly; and (3) allowing lithium ions during charging/discharging to selectively diffuse in easier directions due to the presence of multiple migration directions of lithium ions that have reached voids from the interior of particles (for example, when a pore has only one outlet, which faces the current collector side, diffusion of lithium ions is slow), and as a result, charge/discharge characteristics, especially rate characteristics, are enhanced. In particular, according to the inventors' findings, such superior rate characteristics can be achieved also in an electrode designed to give a high volume energy density (for example, an electrode having a high electrode density of 3.4 g/cc or greater and a large thickness of 50 µm or greater).

The voidage of the coarse secondary particles is 5 to 25%, preferably 5 to 20%, more preferably 5 to 18%, and even more preferably 7 to 15%. With such a low voidage, it is possible to significantly increase the volume energy density while ensuring basic functions as voids for improving charge/discharge characteristics.

The through hole ratio of the coarse secondary particles is 70% or greater, more preferably 75% or greater, and even more preferably 80% or greater. In this way, the higher the through hole ratio, the more preferable it is, and therefore the upper limit is not particularly set. The through hole ratio is typically 90% or less. An extremely high through hole ratio with a voidage within the above range makes it possible to significantly enhance charge/discharge characteristics, especially rate characteristics.

Through holes among all voids in the coarse secondary particles preferably have an average through hole diameter of 0.5 to 5 µm, more preferably 0.6 to 3 µm, and even more preferably 0.6 to 2 µm. When the average through hole diameter is relatively large in this way, an electrically conductive additive (such as acetylene black) easily enters pores. Naturally, a binder may also enter pores together with an electrically conductive additive, but plugging of pores with these is unlikely to occur, and prevention of permeation and diffusion of an electrolytic solution can be suppressed. That is, once pores are plugged, flowability is poor even when an electrolytic solution permeates, but a relatively large average through hole diameter as described above can suppress it. As a result, an electrolytic solution can diffuse through the interior of particles over the entire electrode without being blocked even when there are large particles.

The average particle diameter of single-crystal primary particles is preferably 0.5 µm or greater and 5 µm or less, more preferably 0.6 µm or greater and 3 µm or less, and even more preferably 0.7 µm or greater and 1.5 µm or less. An average particle diameter of single-crystal primary particles within the above range ensures crystallinity of the single-crystal primary particles.

The value obtained by dividing the average particle diameter of the primary particles by the average through hole diameter (hereinafter referred to as the value of "average primary particle diameter/average through hole diameter") is preferably from 0.2 to 2, more preferably from 0.4 to 1.8, and even more preferably from 0.5 to 1.5. When the value is within such a range, the maximum level of lithium ion conductivity and electron conductivity in the secondary particles are obtained. That is, when the value of "average primary particle diameter/average through hole diameter" is 0.2 or greater, an excessive increase in grain boundary resistance due to an excessive increase in the number of primary particles existing around the through holes is prevented, and thus deterioration of output characteristics and rate characteristics can be prevented. Also, when the value of "average primary particle diameter/average through hole diameter" is 2 or less, points of contact between primary particles existing around the pores are increased, sufficient electron conduction paths and lithium ion diffusion paths (in particular, electron conduction paths) are ensured, and thus deterioration of output characteristics can be prevented.

The open pore ratio in the coarse secondary particles is preferably 50% or greater, more preferably 60% or greater, even more preferably 70% or greater, particularly preferably 80% or greater, and most preferably 90% or greater. In this way, the higher the open pore ratio is, the more preferable it is, and the upper limit is thus not particularly set. A high open pore ratio at a voidage within such a range facilitates permeation of an electrolytic solution into tertiary particles through open pores and thus enhances ionic conductivity. At the same time, a sufficiently large number of binding points between the primary particles can be ensured at the non-open pore region, in which the binding points serve as electron conduction paths due to the tight bonding between the numerous primary particles, thus making it possible to suppress deterioration of the electron conductivity associated with the void formation. As a result, it is considered that a good balance can be achieved between electronic conductivity and ionic conductivity, which intrinsically have a trade-off relation, and thus results in an improvement in rate characteristics. The average open pore diameter (the average of the diameters of open pores in the positive electrode active material particles) in the coarse secondary particles is preferably 0.1 μm or greater and 5 μm or less, and more preferably 0.2 μm or greater and 3 μm or less. This range prevents formation of relatively large pores to ensure a sufficient amount of the positive electrode active material per volume, which contributes to charge and discharge. It is also possible to obtain an effect of evenly releasing stress inside by preventing stress concentration at a local place of these large pores. Furthermore, a conductive material and an electrolyte can be easily included to ensure a sufficient stress release effect due to the pores. Therefore, effects of improving charge/discharge characteristics while maintaining a high capacity can be expected.

In the coarse secondary particles, it is preferable that numerous single-crystal primary particles exist around the pores (to such an extent that grain boundary resistance does not excessively increase) and that the directions of electronic conduction and lithium ion diffusion are satisfactorily aligned between the adjacent primary particles. Thereby, electron conduction paths and lithium ion diffusion paths are favorably ensured. Therefore, the resistances of electronic conduction and lithium ion diffusion between the single-crystal primary particles are reduced to improve lithium ion conductivity and electronic conductivity. Therefore, according to such positive electrode active material particles, it is possible to remarkably improve charge/discharge characteristics (particularly, rate characteristics and output characteristics) of the lithium secondary battery.

It is preferable that, as shown in, for example, FIG. 1, secondary particles constituting the positive electrode active material are configured to be in a tertiary particle-like form including a plurality of orientated domains 16 in which the primary particles 12 are oriented in a predetermined direction. In particular, it is preferable that, in each oriented domain 16, the plurality of primary particles 12 are oriented such that the (003) planes along which electron conduction and lithium ion diffusion occur mostly do not intersect each other at least in the one axial direction. It is more preferable that the primary particles are oriented such that the (003) planes are approximately parallel to each other (i.e., the (003) planes mostly do not intersect each other in the directions of two axes). For example, in the positive electrode active material of the present invention, in the case where the hydroxide raw material powder used for the production thereof has orientation, primary particles that have locally taken over the orientation of the hydroxide raw material powder constitute an oriented domain. This oriented domain can be regarded also as a secondary particle in which a plurality of primary particles are oriented in a predetermined direction, and when the oriented domain is as such, the positive electrode active material particles can be considered also as tertiary particles. A positive electrode active material configured to be in a tertiary particle-like form having a plurality of oriented domains in this way would lead to an increased exposure of lithium-ion intercalation/deintercalation planes and electron-conductive planes to the outer surface or the inner surface formed by the open pores, which come into contact with an electrolytic solution, as well as lead to a reduction in the resistance of electronic conduction and lithium ion diffusion in the secondary particles. In particular, typically, in the case where the primary particles are oriented in each oriented domain such that the (003) planes mostly do not intersect each other at least in the one axial direction, a secondary particle is an agglomerate of primary particles oriented in a predetermined direction, and thus directions of electronic conduction and lithium ion diffusion (in particular, the direction of electronic conduction) are likely to be satisfactorily aligned. From this point of view as well, it can be said that it is easy to ensure electron conduction paths and lithium-ion diffusion paths (in particular, electron conduction paths).

Figure 9:
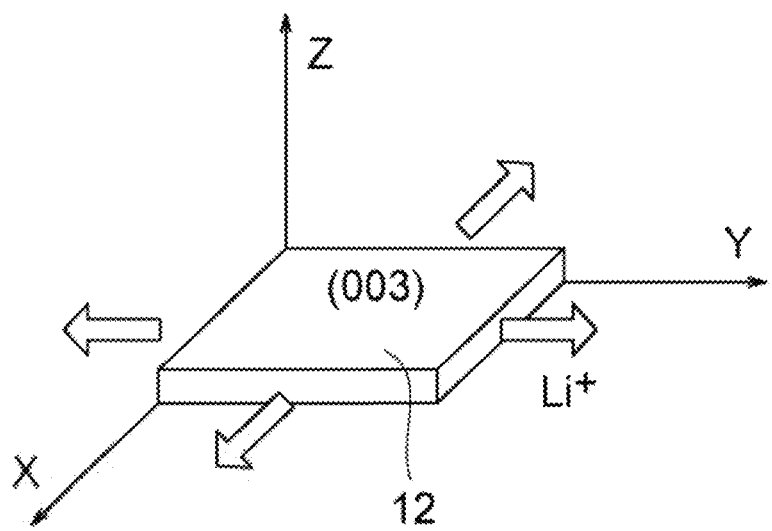
FIG. 9 is a schematic diagram for explaining that lithium ions move along the in-plane direction of the (003) plane in a primary particle.
Figure 10:
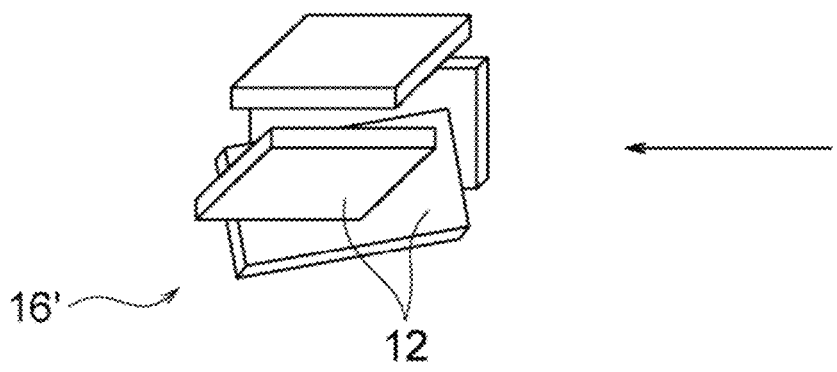
FIG. 10 is a perspective diagram schematically showing an example of the form of orientation of an oriented domain.
Figure 11:
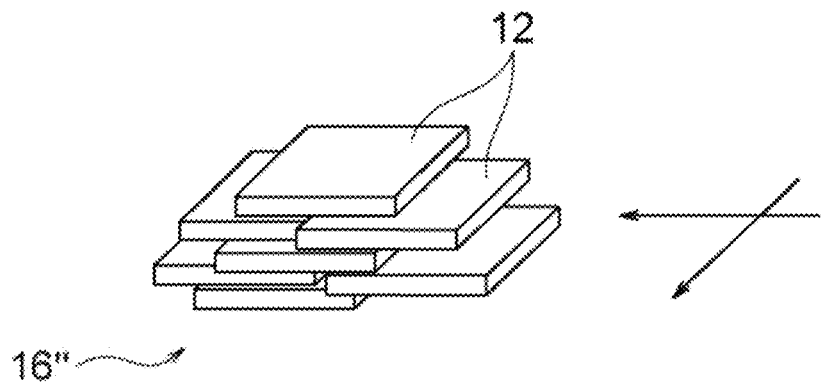
FIG. 11 is a perspective diagram schematically showing another example of the form of orientation of an oriented domain.

That is, as schematically shown in FIG. 9 with the xyz coordinate system, in each primary particle 12, lithium ions move along in-plane directions (e.g., x and y directions in the figure) of the (003) plane perpendicular to the z axis due to the layered rock-salt structure. Therefore, in the form of the oriented domain 16 containing the plurality of primary particles 12, as long as the (003) planes thereof are oriented so as not to mostly intersect each other at least in the one axial direction, lithium ions can move in the direction of this axis without being hampered. Accordingly, as shown in FIG. 10, as long as the plurality of primary particles 12 are oriented such that the (003) planes thereof mostly do not intersect each other in the one axial direction indicated by the arrow, the movability of lithium ions is ensured at least in the direction of this axis in each oriented domain 16'. Naturally, as shown in FIG. 11, it is more preferable that the plurality of primary particles 12 are oriented such that the (003) planes thereof are approximately parallel to each other (i.e., the (003) planes mostly do not intersect each other in the directions of two axes), and, in this case, the movability of lithium ions along in-plane directions of the mutually parallel (003) planes is ensured in each oriented domain 16".

Therefore, although the coarse secondary particle 10 shown in FIG. 1 has the form of an approximately spherical, isometric secondary particle, the coarse secondary particles in the present invention may have the form of a uniaxially oriented, plate-like secondary particle. Preferably, at least part of the coarse secondary particles can be uniaxially oriented, plate-like coarse secondary particles in which primary particles are oriented in the one axial direction and which has an aspect ratio of 2.0 or greater, more preferably and 2.0 to 4.0, and even more preferably 2.0 to 3.0. An aspect ratio of 2.0 or greater specifies coarse, uniaxially oriented, plate-like coarse particles as a form distinguishable from approximately spherical, isometric secondary particles. Such uniaxially oriented, plate-like coarse secondary particles are flat, and thus, when configured as a positive electrode, are easily arranged in the positive electrode so as to be parallel to the electrode surface, and a high level of packability is easily achieved. In particular, there is an advantage in that an enhancement of volume energy density by an enhancement of press density can also be expected when the uniaxially oriented, plate-like coarse secondary particles are mixed with fine secondary particles that are smaller than the coarse secondary particles. Moreover, since the length in the shorter-axis direction of a uniaxially oriented, plate-like coarse secondary particle is shorter than that of an isometric secondary particle when compared at the same volume, a high through hole ratio is easily obtained, and permeability of an electrolytic solution is favorably ensured. Therefore, the above-described disadvantages that lithium ions migrated from the negative electrode have to go through narrow and tortuous paths, which makes it difficult for lithium ions to diffuse in the interior of the positive electrode, are overcome or reduced, thereby making it possible to contribute to an enhancement of rate characteristics. Typically, the uniaxially oriented, plate-like coarse secondary particles are oriented such that the (003) planes of primary particles are parallel with the plate surfaces of the uniaxially oriented, plate-like coarse secondary particles, and the peak intensity ratio [003]/[104], which is the ratio of the intensity of diffraction from the (003) plane to the intensity of diffraction from the (104) plane in X-ray diffraction, is preferably 3.0 or greater, more preferably 5.0 or greater, and even more preferably 7.0 or greater. The uniaxially oriented, plate-like coarse secondary particles preferably have a thickness of 10 to 20 µm and a width of 30 to 100 µm. The uniaxially oriented, plate-like coarse secondary particles preferably have a voidage of 5 to 25% and more preferably 6 to 20%. Approximately all the coarse secondary particles may be uniaxially oriented, plate-like coarse secondary particles, or some of the coarse secondary particles may be uniaxially oriented, plate-like coarse secondary particles, and the rest of the coarse secondary particles may be coarse secondary particles in another form (preferably approximately spherical, isometric coarse secondary particles, as shown in FIG. 1).

According to a preferable embodiment of the present invention, at least part of the plurality of secondary particles constituting the positive electrode active material are approximately spherical, isometric secondary particles, and thereby the positive electrode active material can contain a mixture of approximately spherical, isometric secondary particles and uniaxially oriented, plate-like coarse secondary particles. In this case, the proportion of the uniaxially oriented, plate-like coarse secondary particles among all the secondary particles is preferably 20 to 70% by mass, more preferably 20 to 55% by mass, and even more preferably 20 to 40% by mass. In this way, mixing secondary particles having mutually different shapes and forms allows a high press density to be more easily achieved even at a relatively low pressing pressure when particles are pressed to constitute a positive electrode, and as a result, an enhancement of volume energy density and, accordingly, a higher output can be expected. This advantage is especially applicable to the case where, in particular, fine secondary particles other than coarse secondary particles are mainly composed of approximately spherical, isometric secondary particles.

According to another preferable embodiment of the present invention, approximately all (i.e., 100% of) the plurality of secondary particles constituting the positive electrode active material may be uniaxially oriented, plate-like coarse secondary particles. In this case, it is preferable that, during or prior to the preparation of a positive electrode, the uniaxially oriented, plate-like coarse secondary particles are added to and mixed with approximately spherical, isometric secondary particles that have been separately provided in advance, and then used. When used in this manner, the uniaxially oriented, plate-like coarse secondary particles are a positive electrode active material by themselves, while it can also be said that they are used as an additive or a functional promoter for a positive electrode active material composed of approximately spherical, isometric secondary particles. Mixing secondary particles having mutually different shapes and forms in this way allows a high press density to be more easily achieved even at a relatively low pressing pressure when particles are pressed to constitute a positive electrode, and as a result, an enhancement of volume energy density and, accordingly, a higher output can be expected. This advantage is especially true in the case where, in particular, fine secondary particles other than coarse secondary particles are mainly composed of approximately spherical, isometric secondary particles.

In any case, the positive electrode active material at least part of which is coarse secondary particles and which may optionally contain fine secondary particles have an average particle diameter (volume-based average particle diameter D50) of 5 to 100 µm and preferably 5 to 40 µm. With an average particle diameter within such a range, the packability of the positive electrode active material is improved, thus making it possible to increase the electrode density and also prevent deterioration of the output characteristics and the rate characteristics of the lithium secondary battery as well as deterioration of the flatness of the electrode surface. Distribution of the particle diameter of the positive electrode active material particles may be sharp or broad, and may have a plurality of peaks. For example, when the distribution of the particle diameter of the positive electrode active material particles is not sharp, it is possible to increase the packing density of the positive electrode active material in the positive electrode active material layer, or to strengthen the adhesion between the positive electrode active material layer and the positive electrode current collector. This can further improve the charge/discharge characteristics. In particular, when a slurry containing a water-soluble lithium compound is used as a binder as well as a lithium source, it becomes easier to stably obtain a positive electrode active material having an average particle diameter within the above range (in particular, 5 µm to 40 µm).

The positive electrode active material preferably has a tap density of 2.5 to 3.1 g/cc and more preferably 2.6 to 3.0 g/cc. A tap density within such a range means that the positive electrode active material has a high density, and thus results in a positive electrode active material having a high volume energy density.

The positive electrode active material preferably has a press density of 3.0 to 3.5 g/cc and more preferably 3.2 to 3.4 g/cc when uniaxially pressed at a pressure of 1.0 kgf/cm². A press density within such a range means a high density when an electrode is formed, and thus results in a positive electrode active material having a high volume energy density. In particular, when the positive electrode active material contains a mixture of approximately spherical, isometric secondary particles and uniaxially-oriented, plate-like coarse secondary particles, a high press density is easily achieved even at a relatively low pressing pressure. This advantage is especially true in the case where, in particular, fine secondary particles other than coarse secondary particles are mainly composed of approximately spherical, isometric secondary particles.

The positive electrode active material of the present invention comprises secondary particles composed of numerous primary particles composed of a lithium-nickel based complex oxide having a layered rock-salt structure. The "layered rock-salt structure" refers to a crystal structure in which a lithium layer and a layer of a transition metal other than lithium are stacked alternately, with an oxygen layer being interposed therebetween (typically α-NaFeO₂ type structure: structure in which transition metal and lithium are orderly arranged along the [111] axial direction of a cubic rock-salt type structure). It is possible to preferably use a lithium-nickel based complex oxide represented by the following compositional formula:

$$Li_xNi_{1-z}M_zO_2$$

wherein $0.96 \leq x \leq 1.09$, $0 < z \leq 0.5$, and M is at least one metal element selected from the group consisting of Co, Al, Mg, Mn, Ti, Fe, Cr, Zn, and Ga. The value of x is preferably 0.98 to 1.06 and more preferably 1.00 to 1.04. The value of z is preferably 0.15 to 0.4 and more preferably 0.15 to 0.25. Metal element M is preferably at least one or two metal element(s) selected from the group consisting of Co, Al, Mg, and Mn, and more preferably includes Co and at least one selected from the group consisting of Al, Mg, and Mn, and a particularly preferable combination of metal elements M is Co and Al, or Co and Mn.

Furthermore, a compound containing a metal element that is not contained in the active material, such as a compound containing a transition metal that can have a high valency, e.g., W, Mo, Nb, Ta, and Re, may exist on the surface (including the inner wall of a pore as well) of the positive electrode active material. Such a compound may be a compound of Li and a transition metal that can have a high valency such as W, Mo, Nb, Ta, and Re. The compound containing a metal element may form a solid solution in the positive electrode active material, and may exist as a secondary phase. It is considered that, accordingly, the interface between the positive electrode active material and the non-aqueous electrolytic solution is modified, an electrical charge transfer reaction is promoted, and output characteristics and rate characteristics are improved.

Considering promotion of grain growth or lithium volatilization during firing, a larger amount of the lithium compound may be introduced into the raw material powder such that lithium is in an excess of 0.1 to 40 mol %. In addition, for the purpose of promoting grain growth, a low-melting point oxide (such as bismuth oxide or vanadium oxide), a low-melting point glass (such as borosilicate glass), lithium fluoride, lithium chloride, boron oxide, or the like may be added to the raw material powder in an amount of 0.001 to 30% by mass.

Production Method

The positive electrode active material for lithium secondary batteries of the present invention may be produced by any method, and according to the method of the present invention presented below, it is possible to produce a positive electrode active material comprising coarse secondary particles having a desired voidage and a high through hole ratio, which brings superior battery characteristics, without using a pore-forming agent. That is, as a technique for achieving a desired voidage and average pore diameter, it is considered to incorporate a pore-forming agent (void-forming material) as an additive into the raw material. However, when the amount of the pore-forming agent is reduced to decrease the amount of voids for the purpose of increasing the volume energy density, voids are less likely to be in communication with each other and thus may form closed pores, which lower the output characteristics due to difficulty for an electrolytic solution and a conductive additive to penetrate into the pores. Accordingly, it can be said that it is advantageous to achieve a desired voidage and average pore diameter without using such a pore-forming agent.

The method of the present invention includes the steps of providing a hydroxide raw material powder composed of approximately spherical secondary particles comprising agglomerates of numerous primary particles, at least part of the primary particles being oriented radially outwardly from the centers of the secondary particles; slightly grinding the hydroxide raw material powder to prepare a slurry; using the slurry to produce an approximately spherical granulated powder or plate-like powder containing voids; mixing the granulated powder with a lithium compound to provide a lithium mixed powder; and firing the lithium mixed powder to allow the granulated powder to react with the lithium compound. In this way, according to the method of the present invention, it is possible without using a pore-forming agent to produce a positive electrode active material comprising coarse secondary particles having a desired voidage and a high through hole ratio, which brings superior battery characteristics, by slightly grinding an approximately spherical secondary particle raw material powder and granulating/spheroidizing or granulating/plate-forming (tertiarily granulating) the resultant powder so as to contain voids.

Figure 2:
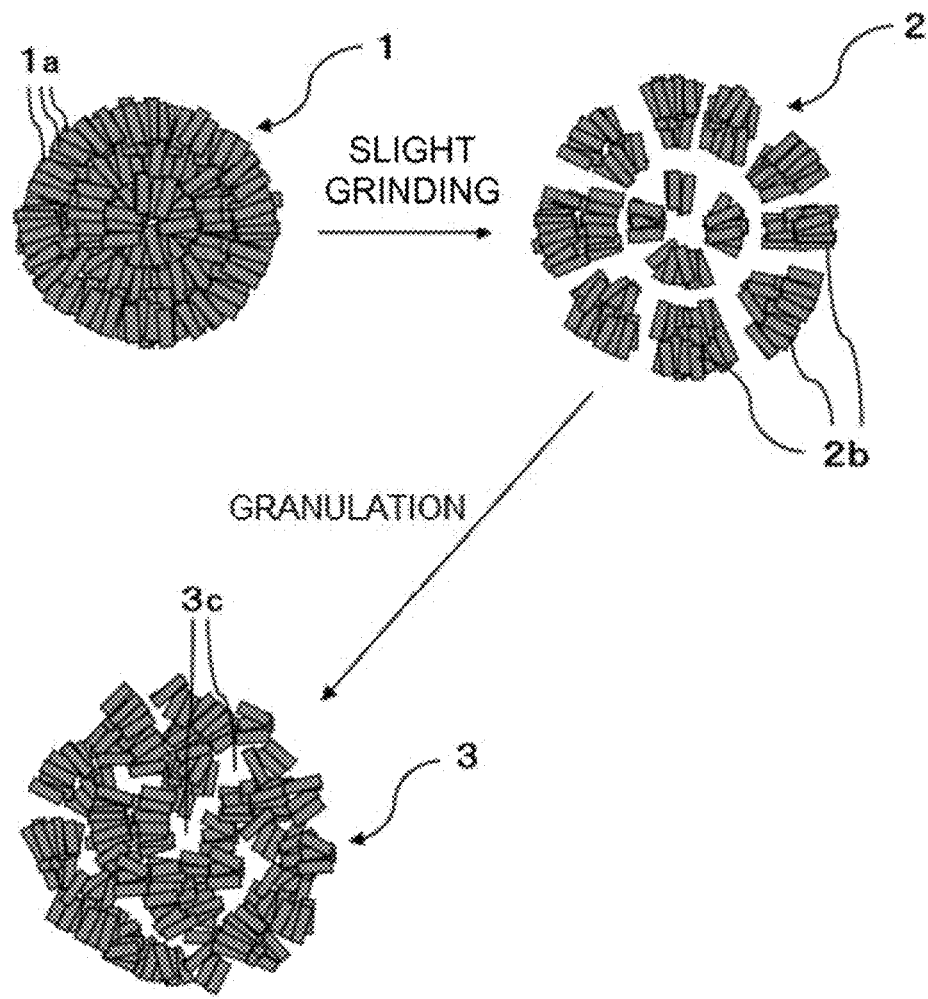
FIG. 2 is a conceptual diagram for illustrating a series of steps up to granulation of a hydroxide raw material powder through slight grinding in the method of the present invention.

That is, in the method of the present invention, at the outset, an aqueous metal element solution, an aqueous caustic alkali solution, and an ammonium ion source are continuously fed into a pH- and temperature-adjusted vessel while controlling the concentration or flow rate, thereby producing a hydroxide raw material powder 1 composed of approximately spherical secondary particles comprising agglomerates of numerous primary particles 1a, at least part of the primary particles 1a being oriented radially outwardly from the centers of the secondary particles, as conceptually shown at the upper left of FIG. 2. Then, as conceptually shown at the upper right of FIG. 2, the hydroxide raw material powder 1 is ground to obtain a ground raw material powder 2 having a predetermined particle size distribution. It is preferable that the ground raw material powder 2 is an aggregate of secondary particles 2b which are oriented in a predetermined direction resulting from the radial orientation of the hydroxide raw material powder 1. Subsequently, a slurry containing such ground raw material powder is prepared and then dried by, for example, spray drying to obtain an approximately spherical, isometric granulated powder 3 as conceptually shown at the lower left of FIG. 2. Alternatively, a plate-like, uniaxially oriented granulated powder containing voids may be obtained by drying and granulating a slurry containing a ground raw material powder with a dryer of a thermal transfer heating type (such as a drum dryer or a CD dryer). The granulated powder 3 thus obtained can also be referred to as a so-called tertiary particle powder in view of the fact that numerous raw material secondary particles are agglomerated. In the granulated powder 3, numerous spaces 3c are formed between the particles of the raw material secondary particle powder constituting the granulated powder due to the shape of the secondary particles 2b of the ground raw material powder 2. When the granulated powder is fired, the numerous spaces result in numerous voids which are likely to be finely communicated with the outside of the positive electrode active material as a fired body, making it easy to form open pores and through holes even with a reduced amount of voids. As mentioned above, it is also possible to use a technique in which voids are formed by taking advantage of melting or vaporization of a pore-forming agent included therein upon firing or calcination. In that case, however, there is a problem that, when the amount of voids is decreased by reducing the amount of the pore-forming agent so as to increase the volume energy density, the voids are less likely to be connected to each other to result in closed pores, which inhibit an electrolytic solution and an electrically conductive additive from permeating into the pores, leading to deterioration of output characteristics. Although it is possible to form pores by adjusting the firing temperature or the like, there arises a problem that closed pores are formed in the region where the amount of voids is small. There also arises a problem that, even if closed pores are not formed, open pores become non-through holes (each having only one inlet-outlet to a surface), which makes it difficult to remove the gas from the pores at the time of injection of an electrolytic solution, making the electrolytic solution less likely to permeate. When it is desired to form open pores as through holes, it is considered to use a method in which three-dimensionally connected voids are formed by suppressing densification at firing and thus leaving fine pores (e.g., 0.1 μm or less) between primary particles. However, there is a problem with a decrease in volume energy density, or a problem with an increase in grain boundary resistance and its resultant increase in resistance of electronic conduction and lithium ion diffusion. Such problems are effectively solved or alleviated according to the method of the present invention.

The respective steps in the method of the present invention will now be specifically described below.

(1) Preparation of Hydroxide Raw Material Powder

In the method of the present invention, there is provided a hydroxide raw material powder composed of secondary particles in which numerous primary particles having a composition represented by $Ni_{1-y}M_y(OH)_2$ (wherein $0<y\leq0.5$, and M is at least one metallic element selected from the group consisting of Co, Al, Mg, Mn, Ti, Fe, Cr, Zn, and Ga) are agglomerated, at least a part of the primary particles being oriented radially outwardly from the centers of the secondary particles. Preferably, y satisfies $0.15\leq y\leq0.4$. Metallic element M is preferably at least one or two metal element(s) selected from the group consisting of Co, Al, Mg, and Mn, and more preferably includes Co and at least one selected from the group consisting of Al, Mg, and Mn. A combination of metallic elements M is particularly preferably Co and Al, or Co and Mn.

A predetermined element such as Al among these metal elements M may be absent or deficient in the hydroxide raw material powder and be added in any subsequent step. In this case, it is preferable to add a compound (e.g., an oxide, a hydroxide, a hydrate thereof or the like) containing an element which is at least one selected from the group consisting of Co, Al, Mg, Mn, Ti, Fe, Cr, Zn, and Ga and is absent or deficient in the hydroxide raw material powder, to a slurry and/or a granulated powder in a subsequent slurrying step and/or a lithium mixing step. In this regard, the slurrying step is more preferable in that it is easier to mix an additional element compound. In this way, some elements of metal elements M may be added at any step as long as a positive electrode active material with a desired composition can be obtained. In particular, it is preferable that some of metal elements M to be added in any subsequent step are not main additional elements (e.g., Co or Mn), but additional minor elements (e.g., elements other than Co and Mn). This is because, in the production of the hydroxide raw material powder as a complex hydroxide, a less kinds of elements make it easier to control the shape and composition of particles. That is, in the preparation of the hydroxide raw material powder, it is easy to control the shape and composition of particles by reducing the kind of metal element M to only the main additional element (e.g., Co or Mg), while on the other hand, a desired composition of positive electrode active material can be obtained more precisely by adding additional minor elements (e.g., elements other than Co and Mn), which make it difficult to control the composition in the solution process for preparing the hydroxide raw material powder, at any subsequent steps.

Figure 3:
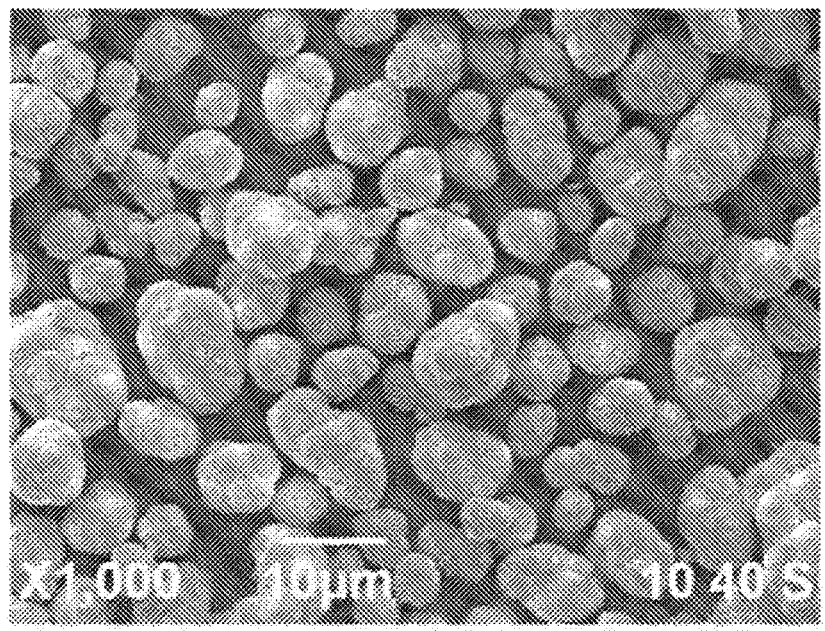
FIG. 3 is an SEM image of an example of a hydroxide raw material powder to be used in the method of the present invention.

The hydroxide raw material powder preferably has, as a secondary particle diameter, a volume-based average particle diameter D50 of 4 μm to 40 μm, more preferably 4 μm to 20 μm, and even more preferably 5 to 15 μm, and an example of the powder is shown in FIG. 3. The hydroxide raw material powder preferably has a tap density of 1.40 g/cc or greater, more preferably 1.5 g/cc or greater, and even more preferably 1.6 g/cc or greater. Since a higher tap density results in a greater difference in density between a void portion and a particle portion in the below-mentioned tertiary particle powder, it becomes possible to achieve a high through hole ratio even with a small voidage, but it is realistic that the tap density is 1.9 g/cc or lower.

Such a hydroxide raw material powder can be produced according to known techniques (see, for example, Patent Documents 3 and 4). For example, it is possible to exemplify a method in which an aqueous nickel salt solution, a metal element M-containing aqueous solution, an aqueous caustic alkali solution, and an ammonium ion source are continuously fed into a pH- and temperature-adjusted vessel while controlling the concentration and flow rate to obtain the hydroxide raw material powder. At this time, it is preferable that the pH in the vessel is controlled within a range from 10.0 to 12.0 and the temperature therein is controlled within a range from 40 to 70° C., so as to attain the above tap density and average particle diameter D50.

(2) Grinding and Slurrying Step

The hydroxide raw material powder is ground to obtain a ground raw material powder typically having a volume-based particle size distribution, in which particles having particle sizes of 10 μm or greater account for 10% or less, particles having particle sizes of 1 to 10 μm account for 30 to 90%, and particles having particle sizes of 0.1 to 1 μm account for 10 to 70%. A preferable particle size distribution is such that particles having particle sizes of 10 μm or greater account for 10% or less, particles having particle sizes of 1 to 10 μm account for 30 to 60%, and particles having particle sizes of 0.1 to 1 μm account for 40 to 70%, more preferably particles having particle sizes of 10 μm or greater account for 5% or less, particles having particle sizes of 1 to 10 μm account for 40 to 60%, and particles having particle sizes of 0.1 to 1 μm account for 40 to 60%, and especially preferably particles having particle sizes of 10 μm or greater account for 2% or less, particles having particle sizes of 1 to 10 μm account for 43 to 55%, and particles having particle sizes of 0.1 to 1 μm account for 43 to 55%. Such a particle size distribution leads to formation of numerous spaces of moderate size in the tertiary particle powder, and thus becomes advantageous to achieve a high through hole ratio even at a low voidage. That is, it becomes easier to introduce open pores into the tertiary particle powder. In addition, controlling the particle size distribution within the above range makes it possible to suitably alter the voidage and the void diameter. Moreover, since the resultant ground raw material powder has a configuration such that particles with smaller particle diameters interpose between particles with larger particle diameters, the entire ground power has a high agglomeration force, which can also make the granulated powder less likely to crumble.

Figure 4:
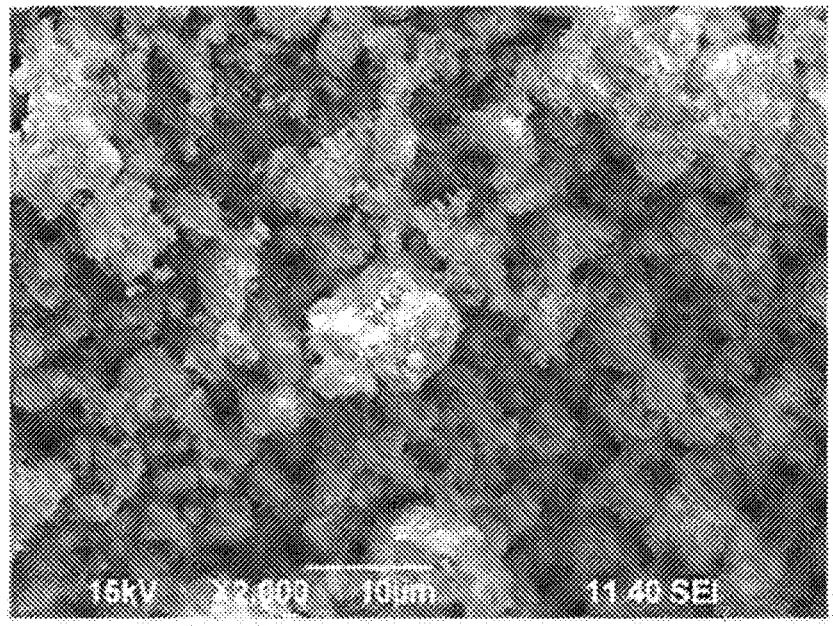
FIG. 4 is an SEM image of an example of a ground powder obtained in the grinding step of the present invention.
Figure 5:
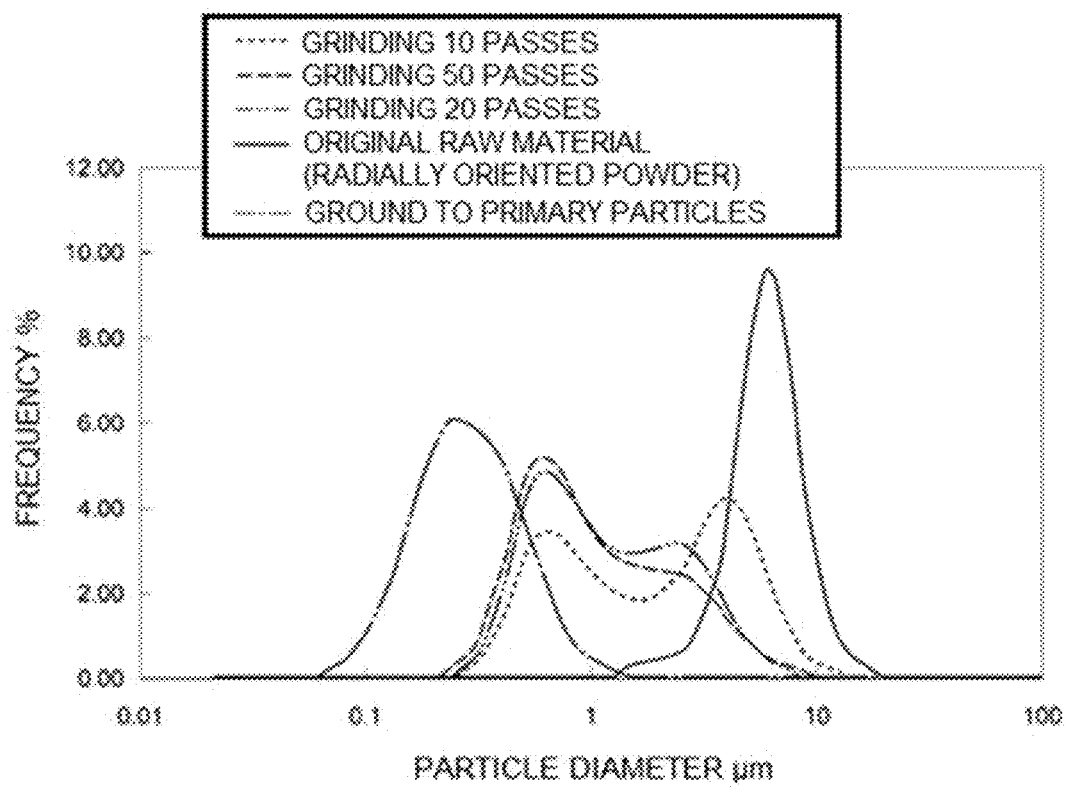
FIG. 5 is a diagram showing examples of particle size distributions of powders obtained under various grinding conditions.

The above particle size distribution can be achieved by slightly grinding the hydroxide raw material powder. As shown at the upper right of FIG. 2, it is preferable that the ground powder 2 obtained by slight grinding mainly includes larger particles and smaller particles resulting from being broken into units of the oriented secondary particles 2b oriented in a predetermined direction derived from the orientation of the radially oriented powder. The larger particles may retain most of the original shape of the radially oriented powder or have a size close to that of the radially oriented powder. An example of the ground raw material powder actually obtained in this way is shown in FIG. 4. Examples of grinding techniques include beads milling, ball milling, jet milling, and grinding by a mechanical grinder, among which beads milling is preferable. It is possible to control the particle size distribution as desired by suitably altering the grinding time and other various grinding conditions (e.g., the number of passes, size of grinding ball, amount of grinding ball, mill rotating speed, etc.). For example, an example of a change in particle size distribution depending on the number of grinding passes is shown in FIG. 5. In this figure, when the number of passes through which the hydroxide raw material powder designated as an "original raw material" is ground by a beads mill is changed from 10 through 20 to 50, a frequency peak or shoulder arises in a larger particle diameter range of 1 to 10 μm while another frequency peak arises within a smaller particle diameter range of 0.1 to 1 μm. That is, slight grinding results in a ground raw material powder having two frequency peaks in a particle size distribution, and such a particle size distribution is included in the above numerical range. Therefore, as similarly shown in FIG. 5, when the raw material powder is excessively ground to the level of primary particles, the resulting ground powder no longer has two frequency peaks and thus such a particle size distribution falls outside the above numerical range.

A hydroxide raw material powder is used to form a slurry. This slurrying step may be performed simultaneously with the above grinding step, or may be performed after grinding. Preparation of the slurry can be performed, for example, by mixing a hydroxide raw material powder (approximately spherical secondary particles) with a dispersion medium such as water. Therefore, when the slurrying step and the grinding step are simultaneously performed, a hydroxide raw material powder may be ground in a dispersion medium such as water. A binder or a dispersing agent may or may not be added to the slurry.

The slurry is preferably an aqueous slurry containing water as a dispersion medium. In this case, it is more preferred that the aqueous slurry is allowed to further contain a water-soluble lithium compound to form an aqueous lithium compound solution. The water-soluble lithium compound can not only function as a lithium source, but also function as a binder which enables bonding of the secondary particles of the hydroxide raw material powder to form tertiary particles in the subsequent granulation step. Accordingly, the use of the water-soluble lithium compound in the aqueous slurry makes it more likely to stably obtain a granulated powder having a desired particle diameter, and even makes it possible to dispense with the subsequent lithium mixing step as needed. Moreover, since the use of an organic binder can also be omitted, it is also possible to dispense with a degreasing step for eliminating an organic binder. Preferred examples of the water-soluble lithium compound include lithium hydroxide, lithium nitrate, lithium chloride, lithium oxide, and lithium peroxide, among which lithium hydroxide is more preferable in that it brings a high binder effect and facilitates lithium introduction due to high reactivity.

The aqueous slurry preferably contains the water-soluble lithium compound in a Li/(Ni+M) molar ratio of 0.01 to 0.20, more preferably 0.02 to 0.15, and even more preferably 0.04 to 0.10. A molar ratio within this range results in a high capacity in terms of battery characteristics. While the reason therefor is not necessarily clear, it is conjectured that favorable reactivity with the water-soluble lithium compound added in the above range is attained. That is, it is considered that when the Li/(Ni+M) ratio is 0.01 or greater, lithium exists also in a granulated powder in advance, and therefore lithium can be sufficiently supplied to the reaction during firing, and thereby a lithium-poor region is unlikely to be formed in the interior of the active material. That is, when no lithium exists in the granulated powder, in order to allow the central part of the granulated powder to sufficiently react with lithium, it is necessary to allow lithium to diffuse over a relatively long distance from outside the granulated powder to the central part. However, if lithium is present in the granulated powder in advance, it is possible to cause lithium to reach the central part through a relatively short diffusion distance, and therefore it is possible to allow lithium to sufficiently react also in the vicinity of the center where a region of insufficient reaction is likely to be created. Moreover, it is considered that when the Li/(Ni+M) ratio is 0.10% or less, the amount of gas that is generated during the reaction of the water-soluble lithium compound and may stay in the granulated powder (in the case of lithium hydroxide, water vapor is produced as shown in the following formula) is reduced, thus a decrease in the relative concentration of oxygen necessary for the reaction is suppressed, and thereby a region where oxygen is deficient is unlikely to be formed.

<One Example of Reaction Between Lithium Hydroxide and Hydroxide Raw Material Powder>

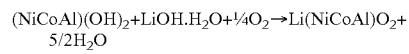

$$(NiCoAl)(OH)_2 + LiOH \cdot H_2O + 1/4 O_2 \rightarrow Li(NiCoAl)O_2 + 5/2 H_2O$$

As mentioned above, a compound of an element which is at least one selected from the group consisting of Co, Al, Mg, Mn, Ti, Fe, Cr, Zn, and Ga and is absent or deficient in the hydroxide raw material powder may be added to the slurry.

(3) Drying/Granulation (Tertiary Granulation) Step

Figure 6:
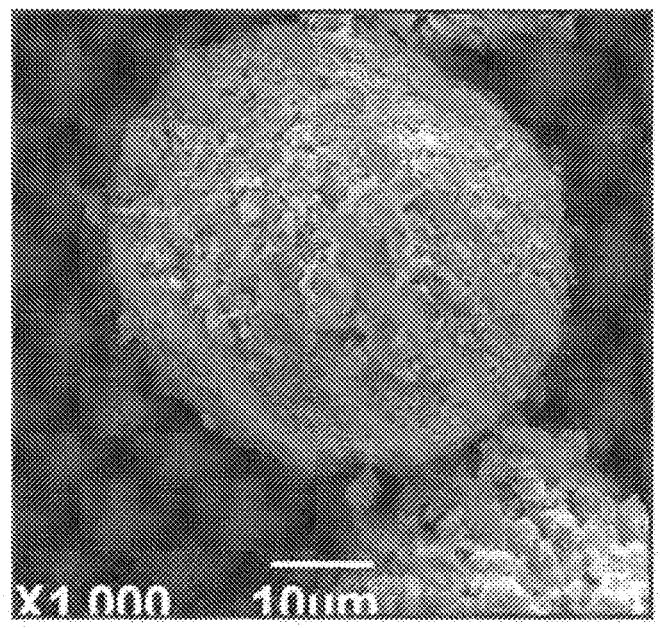
FIG. 6 is an SEM image of an example of a granulated powder obtained in the granulation step of the present invention.

An approximately spherical, isometric granulated powder containing voids can be obtained as a tertiary particle powder by drying and granulating the above slurry through spray drying or the like. An example of the granulated powder is shown in FIG. 6. On the other hand, a plate-like, uniaxially oriented granulated powder can be obtained by drying and granulating the above slurry with a dryer of a thermal transfer heating type (such as a drum dryer or a CD dryer). While the particle diameter of this granulated powder becomes a direct factor which determines the average particle diameter of the positive electrode active material and is thus suitably adjusted according to the application of the particles, in general the volume-based average particle diameter D50 is set within the range of from 5 to 40 μm and preferably 7 to 40 μm in view of the relation with tap density, press density, electrode film thickness or the like. Naturally, in the case of a plate-like, uniaxially oriented granulated powder, it is desirable to impart a relatively large size to the granulated powder such that the uniaxially oriented, plate-like coarse secondary particles obtained after firing have a thickness of 10 to 20 μm and a width of 30 to 100 μm. The drying/granulation method is not particularly limited as long as a raw material powder is loaded and then formed into an approximately spherical shape or a plate shape. Moreover, the plate-like granulated powder may be subjected to pulverization for particle diameter adjustment. Examples of the pulverizing method include a method of pressing against a mesh using a spatula; a method of pulverizing using a pulverizing machine with a weak pulverizing force, such as a pin mill; a method in which sheet strips are collided with each other in an air current (for example, a method of charging in an air classifier); a method using a revolving jet mill; a pot pulverizing method; and a barrel polishing method.

The atmosphere during drying is not particularly limited and may be either air or an inert gas. In the case of using a water-soluble lithium compound in the above slurrying step, an atmosphere of an inert gas such as a nitrogen or argon is preferably used. This is because, when drying is performed by spray drying or the like in air, lithium carbonate having poor reactivity can precipitate due to carbon dioxide in air and thus a reaction with a lithium compound in the firing step (lithium introduction step) may require a long time. In the drying, the added water-soluble lithium compound precipitates between the secondary particles constituting the granulated powder, and thus can function as a binder.

The granulated powder obtained in this way as a tertiary powder is a powder that should be referred to as an active material precursor powder, and may be subjected to the subsequent lithium mixing step (which can be omitted in some cases) and firing step (a lithium introduction step) as-is, or may be commercially traded as an active material precursor powder or a mixed powder of a lithium compound based on the premise that a buyer will perform the aforementioned subsequent steps.

(4) Lithium Mixing Step

The granulated powder is mixed with a lithium compound to form a lithium mixed powder. Any lithium-containing compounds capable of eventually providing a composition $LiMO_2$ of the positive electrode active material can be used as the lithium compound, and preferable examples thereof are lithium hydroxide and lithium carbonate. Prior to the reaction, the pulverized powder is preferably mixed with the lithium compound by a technique such as dry mixing or wet mixing. The average particle diameter of the lithium compound is not particularly limited but is preferably from 0.1 to 5 µm in terms of handling easiness over hygroscopicity as well as of reactivity. In order to enhance the reactivity, the amount of lithium may be set to an excessive amount of about 0.5 to about 40 mol %. Calcination may be performed, or may not be performed, prior to the lithium mixing step. Calcination enables removal of thermally decomposable components such as a hydroxide group contained in the precursor, and it is thus possible to enhance reactivity with lithium in the subsequent firing step. The calcination temperature is preferably 400° C. to 1000° C. While a sufficient thermal decomposition effect is obtained at a temperature of 400° C. or higher, a rapid progress of grain growth is suppressed at a temperature of 1000° C. or lower, and it is thus possible to avoid deterioration of reactivity with lithium in the firing step. The calcination atmosphere is not particularly limited, and may be air or may be $O_2$.

In addition, as mentioned above, a compound of an element which is at least one selected from the group consisting of Co, Al, Mg, Mn, Ti, Fe, Cr, Zn, and Ga and is absent or deficient in the hydroxide raw material powder may be added to the granulated powder.

In the case of using the above-mentioned water-soluble lithium compound as a binder, it is even possible to dispense with the above lithium mixing step. In this case, all the necessary amount of the water-soluble lithium compound may be added to the aqueous slurry in the slurrying step. Nevertheless, a part of the necessary amount of the water-soluble lithium compound may be added to the aqueous slurry, the rest of the water-soluble lithium compound being added in the lithium mixing step to compensate for the shortage.

(5) Firing Step (Lithium Introduction)

Figure 7:
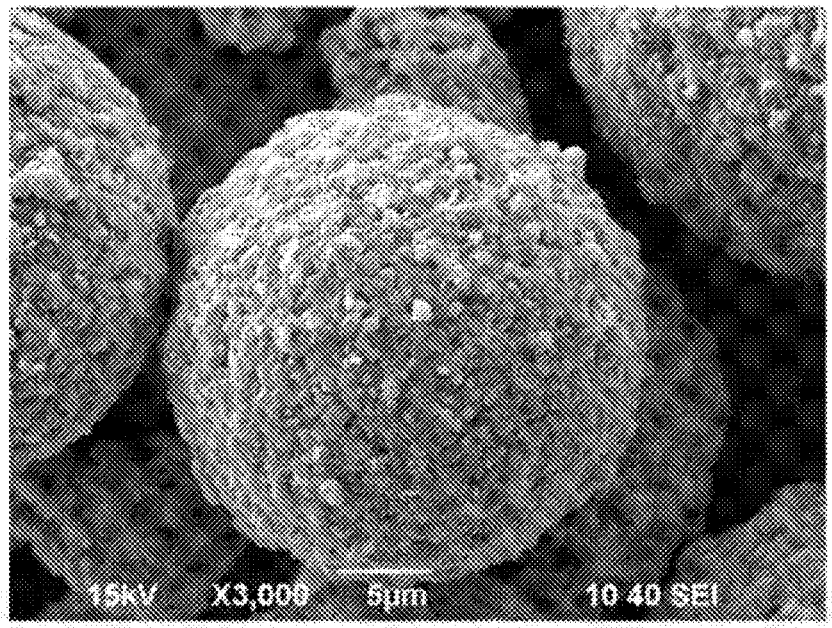
FIG. 7 is an SEM image of an example of a positive electrode active material obtained in the firing step of the present invention.
Figure 8:
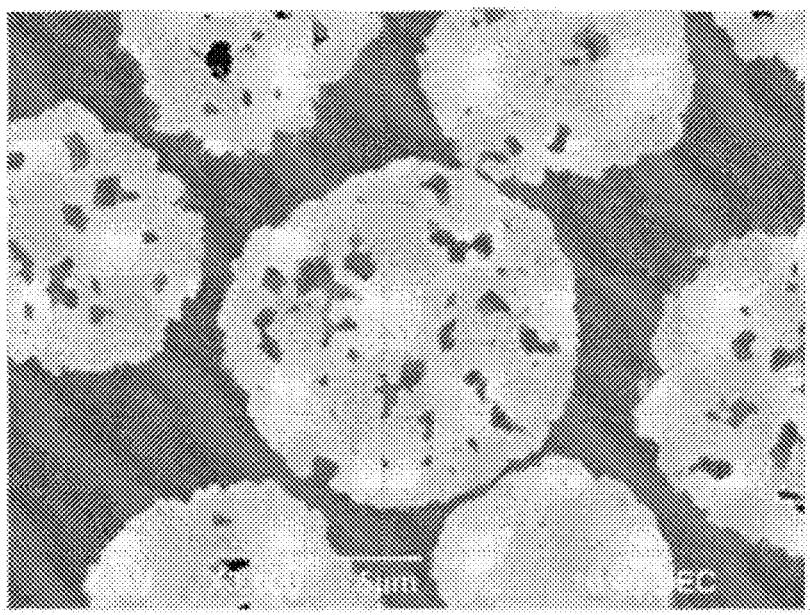
FIG. 8 is a cross-sectional SEM image showing an example of open pores of a positive electrode active material obtained in the method of the present invention. This image was obtained by embedding a positive electrode active material powder in a resin, cutting and polishing the powder in the resin through chemical polishing, and observing the resultant cross-section by SEM.

The lithium mixed powder is fired to allow the granulated powder to react with the lithium compound, thereby providing a positive electrode active material for lithium secondary batteries containing open pores. An example of the positive electrode active material and that of the through hole are shown in FIG. 7 and FIG. 8, respectively. At this time, lithium is introduced into the positive electrode active material precursor particles by firing the above unfired mixture in accordance with a suitable method, thereby providing positive electrode active material particles. For example, the firing may be performed by putting a saggar containing the above unfired mixture in a furnace. During this firing, synthesis of the positive electrode active material as well as sintering and grain growth of the particles are performed, while at the same time open pores are formed due to the space between raw material powder secondary particles.

The firing temperature is preferably from 600° C. to 1100° C., within which grain growth becomes sufficient and suppresses decomposition of the positive electrode active material or volatilization of lithium to make it easier to achieve a desired composition. The firing time is preferably from 1 to 50 hours, within which an excessive increase of the energy consumption for the firing can be prevented.

In addition, the temperature retention may be conducted for 1 to 20 hours at a temperature (e.g., 400 to 600° C.) that is lower than the firing temperature, in order to enhance the reactivity between the mixed lithium and precursor in the heating process. Since lithium is melted through this temperature retention step, the reactivity can be enhanced. A similar effect can be obtained by adjusting the temperature rise rate within a certain temperature range (e.g., 400 to 600° C.) in this firing (lithium introduction) step.

The firing atmosphere needs to be suitably set so that decomposition does not proceed during firing. In the case where volatilization of lithium proceeds, it is preferable that a lithium atmosphere is created by disposing lithium carbonate or the like in the same saggar. In such a case where release of oxygen or reduction proceeds during the firing, it is preferable that the firing is performed in an atmosphere under a high oxygen partial pressure. For the purpose of, after the firing, releasing adhesion or agglomeration of the positive electrode active material particles and adjusting the average particle diameter of the positive electrode active material particles, pulverization and classification may be suitably performed.

In addition, a post-heat treatment may be performed at 100 to 400° C. in the positive electrode active material after the firing or pulverization or classification step. Conducting such post-heat treatment step makes it possible to modify the surface layer of the primary particles and thus improves rate characteristics and output characteristics. In addition, water washing treatment may be performed on the positive electrode active material after the firing or pulverization or classification step. Conducting such water washing treatment step makes it possible to remove the unreacted lithium raw material remaining on the surface of the positive electrode active material powder or to remove lithium carbonate formed through adsorption of moisture and carbon dioxide in air onto the surface of the positive electrode active material powder, and thus improves high-temperature storage characteristics (in particular, suppression of gas generation).

Positive Electrode for Lithium Secondary Batteries

When configured as a positive electrode for lithium secondary batteries, the positive electrode active material for lithium secondary batteries of the present invention can achieve a high volume energy density and yet superior rate characteristics. In particular, as described above, according to the inventors' findings, such superior rate characteristics can be achieved also in an electrode designed to give a high volume energy density (for example, an electrode having a high electrode density of 3.4 g/cc or greater and a large thickness of 50 µm or greater). Accordingly, another aspect of the present invention provides a positive electrode for lithium secondary batteries, comprising a positive electrode active material layer comprising the positive electrode active material of the present invention, a binder, and an electrically conductive additive. The binder is not particularly limited, and a known material such as polyvinylidene fluoride (PVDF) may be used. The electrically conductive additive is not particularly limited, and a known material such as carbon, e.g., acetylene black, may be used. It is preferable that the positive electrode active material and the electrically conductive additive are uniformly dispersed in the binder. Moreover, it is preferable that the positive electrode further comprises a positive electrode current collector composed of metal foil or the like and that the positive electrode active material layer is formed thereon.

The positive electrode active material layer preferably has a density of 3.0 g/cc or greater, more preferably 3.4 g/cc or greater, and even more preferably 3.4 to 4.0 g/cc. Such a density can be achieved by pressing the positive electrode active material layer with a uniaxial press or the like, and a high energy density can be achieved. Moreover, the positive electrode active material layer preferably has a thickness of 40 μm or greater, more preferably 50 μm or greater, and even more preferably 50 to 100 μm. Even when configured to have a high volume energy density in this way, the positive electrode of the present invention can achieve superior rate characteristics.

EXAMPLES

The present invention will now be more specifically described below by way of the following Examples. Measurement methods of various properties and evaluation methods of various characteristics are as explained below.

<Particle Diameter D50>

The average particle diameters of a granulated powder and a positive electrode active material were determined by measuring a volume-based average particle diameter D50 (median diameter) with a laser diffraction/scattering type particle size distribution analyzer (e.g., model number "MT3000-II" manufactured by Nikkiso Co., Ltd.) using water as a dispersion medium.

<Aspect Ratio>

A positive electrode active material was embedded in a resin, followed by polishing using a cross-section polisher (CP) so that it was possible to observe the polished cross-section of the positive electrode active material (in the case of plate-like particles, resin embedding was performed while applying a shearing force so that the plate surfaces of the plate-like particles mutually faced the same direction, and polishing was performed from the vertical direction with CP so as to enable observation of the surfaces perpendicular to the plate surfaces). Using a SEM (scanning electron microscope "JSM-6390LA", manufactured by JEOL Ltd.), a cross-sectional image was obtained at a magnification selected so as to include 10 or more positive electrode active material particles having a diameter of 9 μm or greater in the transverse direction in the field of view. In this image, the diameters in the longitudinal direction and the diameters in the transverse direction of all positive electrode active material particles having a diameter of 9 μm or greater in the transverse direction were determined, and the respective average values were regarded as the "diameter in the longitudinal direction" and the "diameter in the transverse direction" of plate-like particles. The value obtained by dividing the "diameter in the longitudinal direction" by the "diameter in the transverse direction" was regarded as an aspect ratio.

<Degree of Orientation>

The positive electrode active material was classified using an air classifier (manufactured by Nisshin Engineering Inc., "TC15") to selectively recover only positive electrode active material coarse secondary particles having a diameter of 9 μm or greater in the transverse direction. 2 g of ethanol was added to 0.1 g of this positive electrode active material, and the mixture was dispersed for 30 minutes with an ultrasonic disperser (ultrasonic cleaner) and spin-coated onto a 25 mm×50 mm glass substrate at 2000 rpm such that positive electrode active material particles that mutually overlapped were minimal and that the longer axis direction of the positive electrode active material (the plate surfaces in the case of plate-like particles) was parallel to the glass substrate surface. Using an X-ray diffractometer (manufactured by Rigaku Corporation, Geiger Flex RAD-IB), an XRD (X-ray diffraction) profile when irradiating the surface of the positive electrode active material with X rays was obtained, and the ratio [003]/[104] of the intensity of diffraction (peak height) from the (003) plane to the intensity of diffraction (peak height) from the (104) plane was determined. According to this method, in the case of plate-like particles, a profile of diffraction by a crystal plane existing parallel to the crystal plane of a particle plate surface, i.e., a crystal plane oriented in the plate surface direction of a particle, is obtained, and the degree of orientation thereof can be evaluated.

<Voidage>

By the method described above, only positive electrode active material coarse secondary particles having a diameter of 9 μm or greater in the transverse direction are selectively recovered, and this positive electrode active material is embedded in a resin, followed by polishing using a cross-section polisher (CP) so that it is possible to observe the polished cross-section of the positive electrode active material, and then a cross-sectional image is obtained with an SEM (scanning electron microscope "JSM-6390LA", manufactured by JEOL Ltd.). The image thus obtained is divided into a void portion and a positive electrode material portion in the cross-section by image processing, and then (area of void portion)/(area of void portion+area of positive electrode material) is determined. This operation was carried out on 10 secondary particles to determine the average, which was regarded as voidage (%).

<Open Pore Ratio>

In the above method for evaluating the voidage, the open pore ratio is determined according to: (area of open pore portion)/(area of open pore portion+area of closed pore portion), provided that the open pore portion corresponds to the void portion which is impregnated with the resin and that the closed pore portion corresponds to the void portion which is not impregnated with the resin. This operation was carried out on 10 secondary particles to determine the average thereof as an open pore ratio. The resin used was SpeciFix 40 manufactured by Struers Corp., and the operation of embedding in the resin was carried out by sufficiently expelling the air existing in the open pores using a vacuum impregnation system (manufactured by Struers Corp. under the apparatus name of "CitoVac") so as to sufficiently impregnate the open pores with the resin, then casting the resin into a powder-filled vessel, and bringing the pressure back to atmospheric pressure.

<Through Hole Ratio>

The state of resin impregnation in voids was evaluated in the same manner as the open pore ratio except that the resin embedding for introducing resin into voids (resin introduction operation) is performed without using a vacuum impregnation apparatus in a manner that a powder is placed at the bottom of a vessel, of which the inner wall the resin is allowed to flow down along so as to slowly permeate the powder due to capillary force. That is, the through hole ratio is determined according to: (area of through hole portion)/(area of through hole portion+area of non-through hole portion), provided that the through hole portion corresponds to the void portion which is impregnated with the resin and that the non-through hole portion corresponds to the void portion which is not impregnated with the resin. This operation was carried out on 10 secondary particles to determine the average thereof as a through hole ratio.

<Average Through Hole Diameter>

Concerning coarse secondary particles having a through hole ratio of 70% or greater, the measured value of the open pore diameter was used. That is, measurement was performed by a mercury intrusion method using a mercury intrusion porosimeter (manufactured by Shimadzu Corporation under the apparatus name of "Autopore IV 9510").

<Primary Particle Diameter/Average Through Hole Diameter>

Using an FE-SEM (field emission scanning electron microscope: manufactured by JEOL, Ltd., under the product name of "JSM-7000F"), an SEM image was taken at a magnification selected so as to include 10 or more single-crystal primary particles constituting a coarse secondary particle in the field of view. In this SEM image, a circumscribed circle was drawn on each of the 10 primary particles to determine the diameter of the circumscribed circle. The average of the obtained 10 diameters was regarded as a primary particle diameter. This primary particle diameter was divided by the average through hole diameter to obtain the ratio of primary particle diameter/average through hole diameter.

<Tap Density>

Tap density was determined by tapping a measuring cylinder containing a powder sample of positive electrode active material particles 200 times using a commercially available tap density measuring device, followed by calculation of (weight of powder)/(bulk volume of powder).

<Press Density>

1.5 g of a positive electrode active material was weighed into a cylindrical die having a diameter of 20 mm and uniaxially pressed at a load of 1.0 kgf/cm$^2$, and (weight of powder)/(bulk volume of pressed powder) was calculated to determine the press density.

<Battery Preparation>

The obtained secondary particle powder, acetylene black, and polyvinylidene fluoride (PVDF) were mixed in a mass ratio of 92:4:4, and then the mixture was dispersed in N-methyl-2-pyrrolidone to prepare a positive electrode active material paste. This paste was applied onto a 20 μm thick aluminum foil as a positive electrode current collector so as to obtain a uniform thickness (thickness after drying was 100 μm). The resultant dried sheet was stamped into disks each having a diameter of 14 mm, followed by adjustment by uniaxial pressing so that the electrode density was 3.4 g/cc to produce a positive electrode plate. The positive electrode plate thus obtained was used to prepare a coin cell. An electrolytic solution was prepared by dissolving LiPF$_6$ to a concentration 1 mol/L in an organic solvent prepared by mixing ethylene carbonate (EC) with an equal volume of diethyl carbonate (DEC).

<Battery Evaluation>

Using a battery (coin cell) for characteristics evaluation as described above, charge/discharge operations were performed in the following manner to evaluate the rate capacity retention ratio. First, constant current charge was performed at a current value of 0.1 C rate until the cell voltage reached 4.3 V. Thereafter, constant voltage charge was performed under current conditions where the cell voltage was maintained at 4.3 V until the current value dropped to 1/20. After pausing for 10 minutes, constant current discharge was performed at a current value of 0.2 C rate until the cell voltage reached 2.5 V, followed by pausing for 10 minutes. These charge/discharge operations were regarded as one cycle, which was repeated twice in total under a condition of 25° C., and the measured value of the discharge capacity in the second cycle was regarded as a "discharge capacity at 0.2 C rate". Then, two-cycle charge/discharge was repeated in the same manner as above while fixing the current value during charging at 0.1 C rate and adjusting the current value during discharging at 2 C rate. The measured value of the discharge capacity in the second cycle was regarded as a "discharge capacity at 2 C rate". The value obtained by dividing the "discharge capacity at 2 C rate" by the "discharge capacity at 0.2 C rate" (actually, a value expressing it in percent) was regarded as a "rate capacity retention ratio".

Example 1

(1) Preparation of Hydroxide Raw Material Powder

A nickel-cobalt complex hydroxide powder having a $(Ni_{0.844}Co_{0.156})(OH)_2$ composition and a secondary particle diameter (volume-based D50) shown in Table 1 was prepared, in which secondary particles were approximately spherical and part of primary particles were oriented radially outwardly from the centers of the secondary particles of the secondary particles. This nickel-cobalt complex hydroxide powder can be produced according to known technology and, for example, was prepared in the following manner. That is, a mixed aqueous solution of nickel sulfate and cobalt sulfate having a concentration of 1 mol/L with a Ni:Co molar ratio of 84.4:15.6 was continuously fed into a reaction vessel containing 20 L of pure water at a feed rate of 50 ml/min, while at the same time ammonium sulfate having a concentration of 3 mol/L was continuously fed into the reaction vessel at a feed rate of 10 ml/min. Meanwhile, an aqueous sodium hydroxide solution having a concentration of 10 mol/L was fed so as to automatically maintain the pH in the reaction vessel at 11.0. The temperature in the reaction vessel was maintained at 50° C., while agitation was constantly conducted by a stirrer. The nickel-cobalt complex hydroxide thus formed was removed by allowing overflow from an overflow pipe, washed with water, dehydrated, and then subjected to drying treatment.

(2) Grinding and Slurry Preparation Step

To the resulting hydroxide raw material powder, boehmite as an Al raw material was added so as to provide a Ni:Co:Al molar ratio of 81:15:4, then 300 parts of pure water was added as a dispersion medium, and the mixture was slightly ground and mixed with a beads mill (SC220/70, manufactured by Nippon Coke & Engineering. Co., Ltd.). This grinding and mixing were performed under beads mill conditions (the number of passes: 15 times, size of grinding ball: 2 mm, amount of grinding ball: 6.6 kg, and mill rotating speed: 900 rpm). The mixture thus obtained was defoamed by stirring under reduced pressure, pure water was added to adjust the viscosity to 0.5 Pa-s (measured using LVT viscometer manufactured by Brookfield), and thereby a slurry was prepared. The solid component concentration of the resulting slurry was 20% by mass.

(3) Drying/Granulation Step

The slurry prepared as mentioned above was dried and granulated by a spray dryer (model type "FOC-16", manufactured by Ohkawara Kakohki Co., Ltd., hot air inlet temperature of 120° C., atomizer rotating speed of 24000 rpm) to produce an approximately spherical secondary particle granulated powder. The particle diameter D50 after drying was 17 μm.

(4) Mixing with Lithium Compound

The resultant powder was mixed with a LiOH.H$_2$O powder (manufactured by Wako Pure Chemical Industries, Ltd.) so as to provide a molar ratio of Li/(Ni$_{0.81}$Co$_{0.15}$Al$_{0.04}$) equal to 1.04.

(5) Firing Step (Lithium Introduction Step)

The above-mentioned mixed powder was charged in a crucible made of high purity alumina, heated in an oxygen atmosphere (0.1 MPa) at 50° C./hour and then subjected to heat treatment at 765° C. for 24 hours to obtain a Li(Ni$_{0.81}$Co$_{0.15}$Al$_{0.04}$)O$_2$ powder. The resultant positive electrode active material was subjected to various measurements, then results as shown in Table 2 were obtained, and superior rate characteristics were obtained.

Example 2

Production and various measurements of a positive electrode active material were performed in the same manner as in Example 1, except that grinding/mixing was performed under beads mill conditions including the number of passes: 25 times, size of grinding ball: 0.5 mm, amount of grinding ball: 4.4 kg, and mill rotating speed: 400 rpm. Results were as shown in Table 2, and superior rate characteristics were exhibited.

Example 3 (Comparative)

Production and various measurements of a positive electrode active material were performed in the same manner as in Example 1, except that grinding/mixing was performed under beads mill conditions including the number of passes: 45 times, size of grinding ball: 0.5 mm, amount of grinding ball: 6.6 kg, and mill rotating speed: 1300 rpm, and then a pore-forming agent (Celish PC 110S, manufactured by Daicel FineChem Ltd.) was added and mixed. Addition of the pore-forming agent was conducted by weighing the pore-forming agent such that the proportion to the total weight of the powder after addition was 7% by mass and adding it to the hydroxide raw material powder. Results were as shown in Table 2. The through hole ratio was relatively low, and the rate characteristics were inferior to Examples 1 and 2.

Example 4

(1) Preparation of Hydroxide Raw Material Powder

A nickel-cobalt-manganese complex hydroxide powder having a (Ni$_{0.5}$Co$_{0.2}$Mn$_{0.3}$)(OH)$_2$ composition and a secondary particle diameter (volume-based D50) shown in Table 2 was prepared, in which secondary particles were approximately spherical and part of primary particles were oriented radially outwardly from the centers of the secondary particles. This nickel-cobalt-manganese complex hydroxide powder can be produced according to known technology and, for example, was prepared in the following manner. That is, a mixed aqueous solution of nickel sulfate, cobalt sulfate, and manganese sulfate having a concentration of 1 mol/L with a Ni:Co:Mn molar ratio of 50:20:30 was continuously fed into a reaction vessel containing 20 L of pure water at a feed rate of 50 ml/min, while at the same time ammonium sulfate having a concentration of 3 mol/L was continuously fed into the reaction vessel at a feed rate of 10 ml/min. Meanwhile, an aqueous sodium hydroxide solution having a concentration of 10 mol/L was fed so as to automatically maintain the pH in the reaction vessel at 11.0. The temperature in the reaction vessel was maintained at 50° C., while agitation was constantly conducted with a stirrer. The nickel-cobalt-manganese complex hydroxide thus formed was removed by allowing overflow from an overflow pipe, washed with water, dehydrated, and then subjected to drying treatment. The series of steps from feeding of the above compounds to the reaction vessel to removal of the hydroxide (that is, the series of steps except for water washing, dehydration, and drying treatment) were all performed in an inert atmosphere.

(2) Grinding and Slurrying Preparation Step

To the resulting hydroxide raw material powder, 300 parts of pure water was added as a dispersion medium, and the mixture was slightly ground and mixed with a beads mill (SC220/70, manufactured by Nippon Coke & Engineering. Co., Ltd.). This grinding and mixing were performed under beads mill conditions (the number of passes: 20 times, size of grinding ball: 0.5 mm, amount of grinding ball: 6.6 kg, and mill rotating speed: 800 rpm). The mixture thus obtained was defoamed by stirring under reduced pressure, pure water was added to adjust the viscosity to 0.5 Pa·s (measured using LVT viscometer manufactured by Brookfield), and thereby a slurry was prepared. The solid component concentration of the resulting slurry was 20% by mass.

(3) Drying/Granulation Step

The slurry prepared as mentioned above was dried and granulated by a spray dryer (model type "FOC-16", manufactured by Ohkawara Kakohki Co., Ltd., hot air inlet temperature of 120° C., atomizer rotating speed of 24000 rpm) to produce an approximately spherical secondary particle granulated powder. The particle diameter D50 after drying was 23 μm.

(4) Mixing with Lithium Compound

The resultant powder was mixed with a LiOH.H$_2$O powder (manufactured by Wako Pure Chemical Industries, Ltd.) so as to provide a molar ratio of Li/(Ni$_{0.5}$Co$_{0.2}$Mn$_{0.3}$) equal to 1.04.

(5) Firing Step (Lithium Introduction Step)

The above-mentioned mixed powder was charged in a crucible made of high purity alumina, heated in air at 50° C./hour and then subjected to heat treatment at 850° C. for 24 hours to obtain a Li(Ni$_{0.5}$Co$_{0.2}$Mn$_{0.3}$)O$_2$ powder. The resultant positive electrode active material was subjected to various measurements, and results as shown in Table 2 were obtained.

Example 5 (Comparative)

Production and various measurements of a positive electrode active material were performed in the same manner as in Example 4, except that grinding/mixing was performed under beads mill conditions including the number of passes: 60 times, size of grinding ball: 0.5 mm, amount of grinding ball: 6.6 kg, and mill rotating speed: 400 rpm, and then a pore-forming agent (Celish PC 110S, manufactured by Daicel FineChem Ltd.) was added and mixed. Addition of the pore-forming agent was conducted by weighing the pore-forming agent such that the proportion to the total weight of the powder after addition was 7% by mass and adding it to the hydroxide raw material powder. Results were as shown in Table 2, the through hole ratio was relatively low, and the rate characteristics were inferior to Example 4.

Example 6

Figure 12:
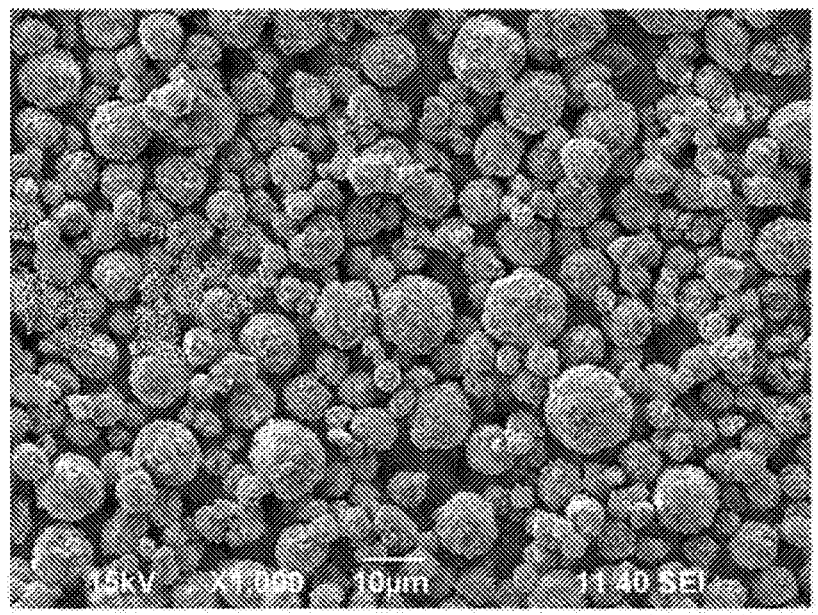
FIG. 12 is an SEM image of a positive electrode active material obtained in Example 6.
Figure 13:
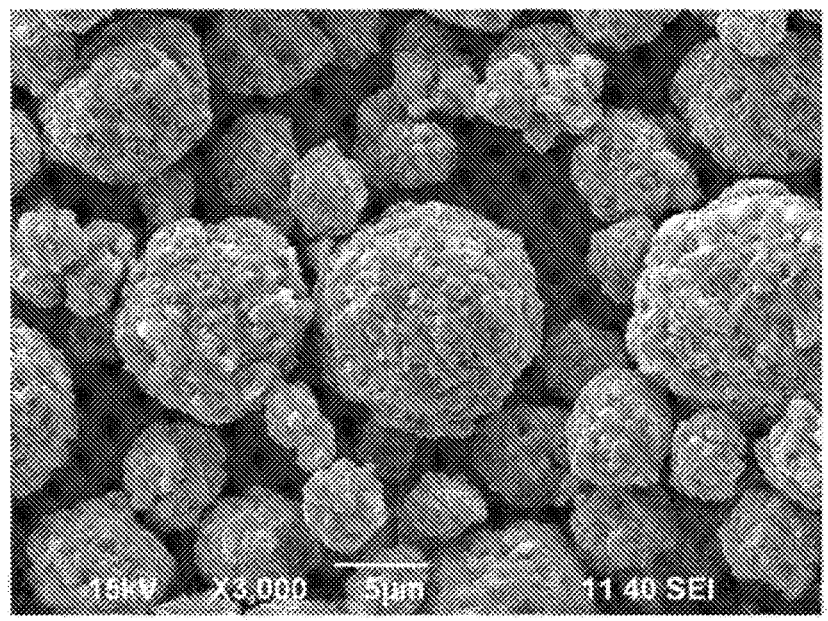
FIG. 13 is an SEM image of a positive electrode active material obtained in Example 6.
Figure 14:
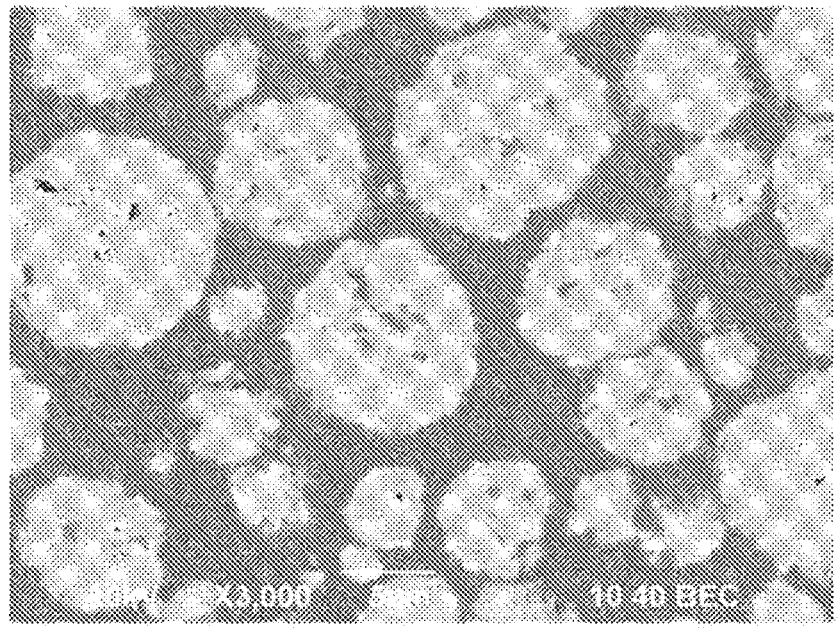
FIG. 14 is a cross-sectional SEM image of a positive electrode active material obtained in Example 6.

Production and various measurements of a positive electrode active material were performed in the same manner as in Example 1, except that the drying and granulating step was performed with a spray dryer (model type "OC-16", manufactured by Ohkawara Kakohki Co., Ltd., hot air inlet temperature of 120° C., sprayed at 0.15 MPa through a TwinJet nozzle). Results as shown in Table 2 were obtained, and superior rate characteristics were obtained. FIGS. 12 and 13 show SEM images of the resultant positive electrode active material taken at 1000 and 3000 magnifications, respectively, and FIG. 14 shows a cross-sectional SEM image of the positive electrode active material that has undergone resin embedding and polishing.

Example 7

Production and various measurements of a positive electrode active material were performed in the same manner as in Example 2, except that the drying and granulating step was performed with a spray dryer (model type "OC-16", manufactured by Ohkawara Kakohki Co., Ltd., hot air inlet temperature of 120° C., sprayed at 0.15 MPa through a TwinJet nozzle). Various measurements were performed, then results as shown in Table 2 were obtained, and superior rate characteristics were obtained.

Example 8 (Comparative)

Production and various measurements of a positive electrode active material were performed in the same manner as in Example 3, except that the drying and granulating step was performed with a spray dryer (model type "OC-16", manufactured by Ohkawara Kakohki Co., Ltd., hot air inlet temperature of 120° C., sprayed at 0.15 MPa through a TwinJet nozzle). Various measurements were performed, then results as shown in Table 2 were obtained, and relatively inferior rate characteristics were only obtained.

Example 9

Production and various measurements of a positive electrode active material were performed in the same manner as in Example 1, except that the drying and granulating step was performed with a spray dryer (model type "OC-16", manufactured by Ohkawara Kakohki Co., Ltd., hot air inlet temperature of 120° C., sprayed at 0.2 MPa through a TwinJet nozzle). Various measurements were performed, then results as shown in Table 2 were obtained, and superior rate characteristics were obtained.

Example 10

Production and various measurements of a positive electrode active material were performed in the same manner as in Example 4, except that the drying and granulating step was performed with a spray dryer (model type "OC-16", manufactured by Ohkawara Kakohki Co., Ltd., hot air inlet temperature of 120° C., sprayed at 0.15 MPa through a TwinJet nozzle). Various measurements were performed, then results as shown in Table 2 were obtained, and superior rate characteristics were obtained.

Example 11 (Comparative)

Production and various measurements of a positive electrode active material were performed in the same manner as in Example 5, except that the drying and granulating step was performed with a spray dryer (model type "OC-16", manufactured by Ohkawara Kakohki Co., Ltd., hot air inlet temperature of 120° C., sprayed at 0.15 MPa through a TwinJet nozzle). Various measurements were performed, then results as shown in Table 2 were obtained, and relatively poor rate characteristics were only obtained.

TABLE 1

| | | Hydroxide raw material powder | Pore-forming agent | Granulated powder | | |
|---|---|---|---|---|---|---|
| | Compositional system | Particle diameter D50 (μm) | Amount added (wt %) | Drying/granulation step | Shape | Particle diameter D50 (μm) |
| Ex. 1 | Ni-based | 10 | 0 | Spray drying | Approximately spherical | 17 |
| Ex. 2 | Ni-based | 10 | 0 | Spray drying | Approximately spherical | 17 |
| Ex. 3* | Ni-based | 10 | 7 | Spray drying | Approximately spherical | 17 |
| Ex. 4 | Ternary | 13 | 0 | Spray drying | Approximately spherical | 23 |
| Ex. 5* | Ternary | 8 | 7 | Spray drying | Approximately spherical | 23 |
| Ex. 6 | Ni-based | 10 | 0 | Spray drying | Approximately spherical | 12 |
| Ex. 7 | Ni-based | 10 | 0 | Spray drying | Approximately spherical | 12 |
| Ex. 8* | Ni-based | 10 | 7 | Spray drying | Approximately spherical | 13 |
| Ex. 9 | Ni-based | 10 | 0 | Spray drying | Approximately spherical | 8 |
| Ex. 10 | Ternary | 13 | 0 | Spray drying | Approximately spherical | 11 |
| Ex. 11* | Ternary | 8 | 7 | Spray drying | Approximately spherical | 10 |

*indicates a comparative example.

TABLE 2

| | Positive electrode active material | | | | | | | | | | | | Battery characteristics |
|---|---|---|---|---|---|---|---|---|---|---|---|---|---|
| | Coarse secondary particle | | | | | | | | | | Electrode | | Rate capacity maintenance |
| | Voidage (%) | Open pore ratio (%) | Through hole ratio (%) | Average through hole diameter (μm) | Primary particle diameter/ average through hole diameter (μm) | Aspect ratio | Degree of orientation (003)/(104) | Particle diameter D50 (μm) | Tap density (g/cc) | Press density (g/cc) | Thickness (μm) | Density (g/cc) | ratio (2 C/0.2 C) (%) |
| Ex. 1 | 12 | 90 | 80 | 2.4 | 0.3 | 1.2 | 1.2 | 13 | 2.8 | — | 50 | 3.4 | 85 |
| Ex. 2 | 6 | 80 | 70 | 2.5 | 0.3 | 1.2 | 1.2 | 14 | 2.9 | — | 50 | 3.4 | 82 |
| Ex. 3* | 10 | 80 | 30 | — | — | 1.2 | 1.2 | 15 | 2.8 | — | 50 | 3.4 | 73 |
| Ex. 4 | 9 | 80 | 75 | 2.0 | 0.4 | 1.3 | 1.1 | 19 | 2.7 | — | 50 | 3.2 | 84 |
| Ex. 5* | 10 | 80 | 35 | — | — | 1.3 | 1.1 | 19 | 2.6 | — | 50 | 3.2 | 72 |
| Ex. 6 | 8 | 85 | 80 | 2.2 | 0.3 | 1.2 | 1.2 | 9 | 2.4 | 3.3 | 50 | 3.4 | 89 |
| Ex. 7 | 5 | 80 | 70 | 2.3 | 0.3 | 1.2 | 1.2 | 8 | 2.4 | 3.3 | 50 | 3.4 | 87 |
| Ex. 8* | 10 | 80 | 30 | — | — | 1.2 | 1.2 | 9 | 2.5 | 3.3 | 50 | 3.4 | 75 |
| Ex. 9 | 8 | 85 | 80 | 2.2 | | 1.2 | 1.2 | 6 | 2.3 | 3.2 | 50 | 3.3 | 91 |
| Ex. 10 | 8 | 80 | 75 | 2.0 | 0.4 | 1.3 | 1.1 | 10 | 2.1 | 3.2 | 50 | 3.2 | 87 |
| Ex. 11* | 8 | 80 | 35 | — | — | 1.3 | 1.1 | 9 | 2.2 | 3.1 | 50 | 3.2 | 75 |

*indicates a comparative example.

In any of Examples 1 to 11, the proportion of coarse secondary particles having a particle diameter of 9 μm or greater among all secondary particles constituting the positive electrode active material was within the range of 20 to 100% by mass.

Next, production examples of positive electrode active materials composed of uniaxially oriented, plate-like coarse secondary particles having an aspect ratio of 2.0 or greater will now be presented.

Example 12

(1) Preparation of Hydroxide Raw Material Powder

A nickel-cobalt complex hydroxide powder having a $(Ni_{0.844}Co_{0.156})(OH)_2$ composition and a secondary particle diameter (volume-based D50) shown in Table 3 was prepared, in which secondary particles were approximately spherical and part of primary particles were oriented radially outwardly from the centers of the secondary particles. This nickel-cobalt complex hydroxide powder can be produced according to known technology and, for example, was prepared in the following manner. That is, a mixed aqueous solution of nickel sulfate and cobalt sulfate having a concentration of 1 mol/L with a Ni:Co molar ratio of 84.4:15.6 was continuously fed into a reaction vessel containing 20 L of pure water at a feed rate of 50 ml/min, while at the same time ammonium sulfate having a concentration of 3 mol/L was continuously fed into the reaction vessel at a feed rate of 10 ml/min. Meanwhile, an aqueous sodium hydroxide solution having a concentration of 10 mol/L was fed so as to automatically maintain the pH in the reaction vessel at 11.0. The temperature in the reaction vessel was maintained at 50° C., while agitation was constantly conducted by a stirrer. The nickel-cobalt complex hydroxide thus formed was removed by allowing overflow from an overflow pipe, washed with water, dehydrated, and then subjected to drying treatment.

(2) Grinding and Slurry Preparation Step

To the resulting hydroxide raw material powder, boehmite as an Al raw material (manufactured by Sasol) and a LiOH.H$_2$O powder as a Li raw material (manufactured by Wako Pure Chemical Industries, Ltd.) were added so as to provide a Ni:Co:Al:Li molar ratio of 81:15:4:20, then 300 parts of pure water was added as a dispersion medium, and the mixture was slightly ground and mixed with a beads mill (SC220/70, manufactured by Nippon Coke & Engineering. Co., Ltd.). This grinding and mixing were performed under beads mill conditions (the number of passes: 15 times, size of grinding ball: 2 mm, amount of grinding ball: 6.6 kg, and mill rotating speed: 900 rpm). The mixture thus obtained was defoamed by stirring under reduced pressure, and pure water was added to adjust the viscosity to 0.5 Pa·s (measured using LVT viscometer manufactured by Brookfield), and thereby a slurry was prepared. The solid component concentration of the resulting slurry was 20% by mass.

(3) Granulation Step (Drying/Pulverization)

The slurry prepared as mentioned above was dried with a drum dryer (manufactured by Katsuragi Ind. Co., Ltd., drum diameter: 800 mm, drum temperature: 100° C., drum rotating speed: 1.5 rpm, gap between roll/drum: 0.2 mm), and pulverized with a pin mill ("160 UPZ" manufactured by Hosokawa Micron Corporation, rotating speed: 3000 rpm) to produce a plate-like secondary particle granulated powder. The particle diameter D50 after drying was 45 μm.

(4) Mixing with Lithium Compound

The resultant powder was mixed with a LiOH.H$_2$O powder (manufactured by Wako Pure Chemical Industries, Ltd.) so as to provide a molar ratio of Li/(Ni$_{0.81}$Co$_{0.15}$Al$_{0.04}$) equal to 1.04.

(5) Firing Step (Lithium Introduction Step)

Figure 15:
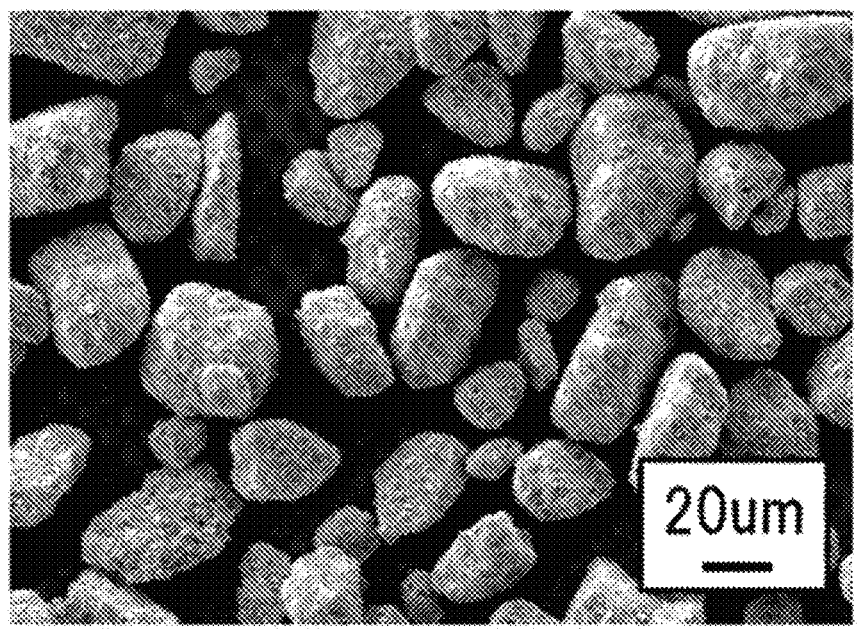
FIG. 15 is an SEM image of a positive electrode active material obtained in Example 12.

The above-mentioned mixed powder was charged in a crucible made of high purity alumina, heated in an oxygen atmosphere (0.1 MPa) at 50° C./hour and then subjected to heat treatment at 765° C. for 24 hours to obtain a Li(Ni$_{0.81}$Co$_{0.15}$Al$_{0.04}$)O$_2$ powder. The resultant positive electrode active material was subjected to various measurements, then results as shown in Table 4 were obtained, and superior rate characteristics were obtained. FIG. 15 shows an SEM image of the resultant positive electrode active material.

Example 13

Production and various measurements of a positive electrode active material were performed in the same manner as in Example 12, except that grinding/mixing was performed under beads mill conditions including the number of passes: 25 times, size of grinding ball: 0.5 mm, amount of grinding ball: 4.4 kg, and mill rotating speed: 400 rpm. Results were as shown in Table 4, and superior rate characteristics were exhibited.

Example 14

Production and various measurements of a positive electrode active material were performed in the same manner as in Example 12, except that pin mill pulverization after a drum dryer in the granulation step (drying and pulverization) was performed under 5000 rpm conditions. Results were as shown in Table 4, and superior rate characteristics were exhibited.

Example 15

(1) Preparation of Hydroxide Raw Material Powder

A nickel-cobalt-manganese complex hydroxide powder having a $(Ni_{0.5}Co_{0.2}Mn_{0.3})(OH)_2$ composition and a secondary particle diameter (volume-based D50) shown in Table 3 was prepared, in which secondary particles were approximately spherical and part of primary particles were oriented radially outwardly from the centers of the secondary particles. This nickel-cobalt-manganese complex hydroxide powder can be produced according to known technology and, for example, was prepared in the following manner. That is, a mixed aqueous solution of nickel sulfate, cobalt sulfate, and manganese sulfate having a concentration of 1 mol/L with a Ni:Co:Mn molar ratio of 50:20:30 was continuously fed into a reaction vessel containing 20 L of pure water at a feed rate of 50 ml/min, while at the same time ammonium sulfate having a concentration of 3 mol/L was continuously fed into the reaction vessel at a feed rate of 10 ml/min. Meanwhile, an aqueous sodium hydroxide solution having a concentration of 10 mol/L was fed so as to automatically maintain the pH in the reaction vessel at 11.0. The temperature in the reaction vessel was maintained at 50° C., while agitation was constantly conducted by a stirrer. The nickel-cobalt-manganese complex hydroxide thus formed was removed by allowing overflow from an overflow pipe, washed with water, dehydrated, and then subjected to drying treatment. The series of steps from feeding of the above compounds to the reaction vessel to removal of the hydroxide (that is, the series of steps except for water washing, dehydration, and drying treatment) were all performed in an inert atmosphere.

(2) Grinding and Slurry Preparation Step

To the resulting hydroxide raw material powder, a $LiOH.H_2O$ powder as a Li raw material (manufactured by Wako Pure Chemical Industries, Ltd.) was added so as to provide a Ni:Co:Mn:Li molar ratio of 50:20:30:20, then 300 parts of pure water was added as a dispersion medium, and the mixture was slightly ground and mixed with a beads mill (SC220/70, manufactured by Nippon Coke & Engineering. Co., Ltd.). This grinding and mixing were performed under beads mill conditions (the number of passes: 20 times, size of grinding ball: 0.5 mm, amount of grinding ball: 6.6 kg, and mill rotating speed: 800 rpm). The mixture thus obtained was defoamed by stirring under reduced pressure, pure water was added to adjust the viscosity to 0.5 Pa·s (measured using LVT viscometer manufactured by Brookfield), and thereby a slurry was prepared. The solid component concentration of the resulting slurry was 20% by mass.

(3) Granulation Step (Drying and Pulverization)

The slurry prepared as mentioned above was dried with a drum dryer (manufactured by Katsuragi Ind. Co., Ltd., drum diameter: 800 mm, drum temperature: 100° C., drum rotating speed: 1.5 rpm, gap between roll/drum: 0.2 mm), and pulverized with a pin mill ("160 UPZ" manufactured by Hosokawa Micron Corporation, rotating speed: 3000 rpm) to produce a plate-like secondary particle granulated powder. The particle diameter D50 after drying was 45 µm.

(4) Mixing with Lithium Compound

The resultant powder was mixed with a $LiOH.H_2O$ powder (manufactured by Wako Pure Chemical Industries, Ltd.) so as to provide a molar ratio of $Li/(Ni_{0.5}Co_{0.2}Mn_{0.3})$ equal to 1.04.

(5) Firing Step (Lithium Introduction Step)

The above-mentioned mixed powder was charged in a crucible made of high purity alumina, heated in air at 50° C./hour and then subjected to a heat treatment at 850° C. for 24 hours to obtain a $Li(Ni_{0.5}Co_{0.2}Mn_{0.3})O_2$ powder. The resultant positive electrode active material was subjected to various measurements, then results as shown in Table 4 were obtained, and superior rate characteristics were obtained.

Example 16

Production and various measurements of a positive electrode active material were performed in the same manner as in Example 15, except that pin mill pulverization after a drum dryer in the granulation step (drying and pulverization) was performed under 5000 rpm conditions. Results were as shown in Table 4, and superior rate characteristics were exhibited.

Furthermore, production examples of positive electrode active materials comprising a mixture of uniaxially oriented, plate-like coarse secondary particles having an aspect ratio of 2.0 or greater and approximately spherical, isometric secondary particles will now be presented.

Example 17

An approximately spherical secondary particle granulated powder as produced by the method of Example 1 and a plate-like secondary particle granulated powder as produced by the method of Example 12 were mixed in a mass ratio of (approximately spherical secondary particle granulated powder):(plate-like secondary particle granulated powder)=75:25, then a positive electrode active material was produced through (4) Mixing with Lithium Compound and (5) Firing Step (Lithium Introduction Step) as in Example 1, and various measurements were performed. Results were as shown in Table 4, and superior rate characteristics were exhibited.

Example 18

An approximately spherical secondary particle granulated powder as produced by the method of Example 4 and a plate-like secondary particle granulated powder as produced by the method of Example 15 were mixed in a mass ratio of (approximately spherical secondary particle granulated powder):(plate-like secondary particle granulated powder)=75:25, then a positive electrode active material was produced through (4) Mixing with Lithium Compound and (5) Firing Step (Lithium Introduction Step) as in Example 1, and various measurements were performed. Results were as shown in Table 4, and superior rate characteristics were exhibited.

TABLE 3

| | Compositional system | Hydroxide raw material powder Particle diameter D50 (μm) | Pore-forming agent Amount added (wt %) | Granulated powder Drying/granulation step | Shape | Particle diameter D50 (μm) |
|---|---|---|---|---|---|---|
| Ex. 12 | Ni-based | 10 | 0 | Drum drying, followed by pin mill pulverization | Plate-like | 45 |
| Ex. 13 | Ni-based | 10 | 0 | Drum drying, followed by pin mill pulverization | Plate-like | 46 |
| Ex. 14 | Ni-based | 10 | 0 | Drum drying, followed by pin mill pulverization | Plate-like | 35 |
| Ex. 15 | Ternary | 10 | 0 | Drum drying, followed by pin mill pulverization | Pate-like | 45 |
| Ex. 16 | Ternary | 10 | 0 | Drum drying, followed by pin mill pulverization | Plate-like | 34 |
| Ex. 17 | Ni-based | 10 | 0 | Combination of Example 1 (75%) and Example 12 (25%) | Plate-like + approximately spherical | 24 |
| Ex. 18 | Ternary | 10 | 0 | Combination of Example 4 (75%) and Example 15 (25%) | Plate-like + approximately spherical | 23 |

TABLE 4

| | Positive electrode active material Coarse secondary particle | | | | | | | | | | | | Battery characteristics Rate capacity maintenance |
|---|---|---|---|---|---|---|---|---|---|---|---|---|---|
| | Voidage (%) | Open pore ratio (%) | Through hole ratio (%) | Average through hole diameter (μm) | Primary particle diameter/ average through hole diameter (μm) | Aspect ratio | Degree of orientation (003)/(104) | Particle diameter D50 (μm) | Tap density (g/cc) | Press density (g/cc) | Electrode Thickness (μm) | Density (g/cc) | ratio (2 C/0.2 C) (%) |
| Ex. 12 | 13 | 90 | 80 | 2.6 | 0.3 | 2.8 | 7.2 | 35 | 2.5 | 3.0 | 50 | 3.3 | 84 |
| Ex. 13 | 6 | 80 | 70 | 2.5 | 0.3 | 2.9 | 16.1 | 37 | 2.6 | 3.1 | 50 | 3.4 | 81 |
| Ex. 14 | 12 | 90 | 80 | 2.5 | 0.3 | 2.1 | 7.2 | 28 | 2.7 | 3.2 | 50 | 3.4 | 85 |
| Ex. 15 | 9 | 80 | 75 | 2.0 | 0.4 | 2.9 | 7.5 | 36 | 2.5 | 3.0 | 50 | 3.3 | 82 |
| Ex. 16 | 8 | 80 | 80 | 2.0 | 0.4 | 2.2 | 7.5 | 28 | 2.6 | 3.2 | 50 | 3.4 | 84 |
| Ex. 17 | 12 | 90 | 80 | 2.4 | 0.3 | 2.0 | 3.3 | 19 | 2.8 | 3.3 | 50 | 3.4 | 87 |
| Ex. 18 | 8 | 80 | 75 | 2.0 | 0.3 | 2.0 | 3.5 | 19 | 2.8 | 3.3 | 50 | 3.4 | 90 |

In any of Examples 12 to 18, the proportion of coarse secondary particles having a particle diameter of 9 μm or greater among all secondary particles constituting the positive electrode active material was within the range of 20 to 100% by mass.

What is claimed is:

1. A positive electrode active material for lithium secondary batteries, comprising a plurality of secondary particles each comprising primary particles composed of a lithium-nickel-based complex oxide having a layered rock-salt structure,
wherein the plurality of secondary particles have a volume-based average particle diameter D50 of 5 to 100 μm, wherein at least part of the plurality of secondary particles are coarse secondary particles having a particle diameter of 9 μm or greater,
wherein the coarse secondary particles have a voidage of 5 to 25%, and wherein a ratio of through holes among all voids in the coarse secondary particles is 70% or greater, and
wherein the through holes are open pores with both ends of each through hole being in communication with outside the coarse secondary particle.

2. The positive electrode active material according to claim 1, wherein a proportion of the coarse secondary particles among all the secondary particles is 20 to 100% by mass.

3. The positive electrode active material according to claim 1, wherein the through holes among all voids in the coarse secondary particles have an average through hole diameter of 0.5 to 5 μm.

4. The positive electrode active material according to claim 1, wherein the primary particles have an average particle diameter of 0.5 to 5 μm.

5. The positive electrode active material according to claim 4, wherein a value obtained by dividing the average particle diameter of the primary particles by an average through hole diameter is 0.2 to 2.

6. The positive electrode active material according to claim 1, having a tap density of 2.5 to 3.1 g/cc.

7. The positive electrode active material according to claim 1, having a press density of 3.0 to 3.5 g/cc when uniaxially pressed at a pressure of 1.0 kgf/cm$^2$.

8. The positive electrode active material according to claim 1, wherein the lithium-nickel-based complex oxide is represented by a general formula:

$$Li_xNi_{1-z}M_zO_2$$

wherein 0.96≤x≤1.09, 0<z≤0.5, and M is at least one metal element selected from the group consisting of Co, Al, Mg, Mn, Ti, Fe, Cr, Zn, and Ga.

9. The positive electrode active material according to claim 1, wherein at least part of the coarse secondary particles are uniaxially oriented, plate-like coarse secondary particles having an aspect ratio of 2.0 or greater, wherein each of the uniaxially oriented, plate-like coarse secondary particle is composed of the primary particles that are oriented in an uniaxial direction.

10. The positive electrode active material according to claim 9, wherein (003) planes of the primary particles in the uniaxially oriented, plate-like coarse secondary particles are oriented in parallel to plate surfaces of the uniaxially oriented, plate-like coarse secondary particles, and wherein a peak intensity ratio [003]/[104] of the uniaxially oriented, plate-like coarse secondary particles, which is a ratio of diffraction intensity from (003) planes to diffraction intensity from (104) planes in X-ray diffraction, is 3.0 or greater.

11. The positive electrode active material according to claim 9, wherein approximately all of the coarse secondary particles are uniaxially oriented, plate-like coarse secondary particles.

12. The positive electrode active material according to claim 9, wherein the uniaxially oriented, plate-like coarse secondary particles have a thickness of 10 to 20 μm and a width of 30 to 100 μm.

13. The positive electrode active material according to claim 9, wherein at least part of the plurality of secondary particles are approximately spherical, isometric secondary particles, and wherein the secondary particles comprises a mixture of the isometric secondary particles and the uniaxially oriented, plate-like coarse secondary particles.

14. The positive electrode active material according to claim 13, wherein a proportion of the uniaxially oriented, plate-like coarse secondary particles among all the secondary particles is 20 to 70% by mass.

15. The positive electrode active material according to claim 1, wherein approximately all of the secondary particles are uniaxially oriented, plate-like coarse secondary particles.

16. A positive electrode for lithium secondary batteries, comprising a positive electrode active material layer comprising the positive electrode active material according to claim 1, a binder, and an electrically conductive additive.

17. The positive electrode according to claim 16, wherein the positive electrode active material layer has a thickness of 50 μm or greater.

18. The positive electrode according to claim 16, wherein the positive electrode active material layer has a density of 3.4 g/cc or greater.

* * * * *